(12) United States Patent
Nakane

(10) Patent No.: US 12,153,263 B2
(45) Date of Patent: Nov. 26, 2024

(54) CLEANING TOOL AND METHOD FOR MANUFACTURING CLEANING TOOL

(71) Applicant: Fujikura Ltd., Tokyo (JP)

(72) Inventor: Junichi Nakane, Chiba (JP)

(73) Assignee: Fujikura Ltd., Tokyo (JP)

( * ) Notice: Subject to any disclaimer, the term of this patent is extended or adjusted under 35 U.S.C. 154(b) by 484 days.

(21) Appl. No.: 17/440,092

(22) PCT Filed: Feb. 27, 2020

(86) PCT No.: PCT/JP2020/007955
§ 371 (c)(1),
(2) Date: Sep. 16, 2021

(87) PCT Pub. No.: WO2020/230405
PCT Pub. Date: Nov. 19, 2020

(65) Prior Publication Data
US 2022/0187545 A1    Jun. 16, 2022

(30) Foreign Application Priority Data
May 10, 2019   (JP) .................................. 2019-090211

(51) Int. Cl.
*G02B 6/38*   (2006.01)
*B08B 1/14*   (2024.01)
*B08B 1/32*   (2024.01)

(52) U.S. Cl.
CPC ............ *G02B 6/3866* (2013.01); *B08B 1/143* (2024.01); *B08B 1/32* (2024.01)

(58) Field of Classification Search
CPC ......... B08B 1/006; B08B 1/001; B08B 1/008; B08B 2240/02; B08B 1/00; B08B 1/04; G02B 6/38; G02B 6/3866
USPC ......................................................... 15/97.1
See application file for complete search history.

(56) References Cited

U.S. PATENT DOCUMENTS

| | | | |
|---|---|---|---|
| 2014/0144468 A1* | 5/2014 | Nakane ................ | B65H 37/007 15/210.1 |
| 2014/0259477 A1 | 9/2014 | Huang | |
| 2018/0088285 A1 | 3/2018 | Braun et al. | |
| 2019/0384012 A1* | 12/2019 | Nakane ..................... | B08B 1/10 |

FOREIGN PATENT DOCUMENTS

| | | |
|---|---|---|
| JP | H02-254407 A | 10/1990 |
| JP | 2000-284144 A | 10/2000 |
| JP | 2014-035491 A | 2/2014 |
| JP | 2018-128598 A | 8/2018 |
| JP | 2019-003006 A | 1/2019 |

* cited by examiner

Primary Examiner — Katina N. Henson
(74) Attorney, Agent, or Firm — Osha Bergman Watanabe & Burton LLP

(57) ABSTRACT

A cleaning tool includes a head, a take-up reel, a driven roller, and a passthrough component. The head presses a cleaning element, having a tape shape, onto an optical connector. The take-up reel reels the cleaning element retrieved from the head. The driven roller guides the cleaning element on a convey path from the head to the take-up reel. The pass-through component includes a slit through which the cleaning element is extended, and the pass-through component is located between the driven rollers and the take-up reel.

7 Claims, 13 Drawing Sheets

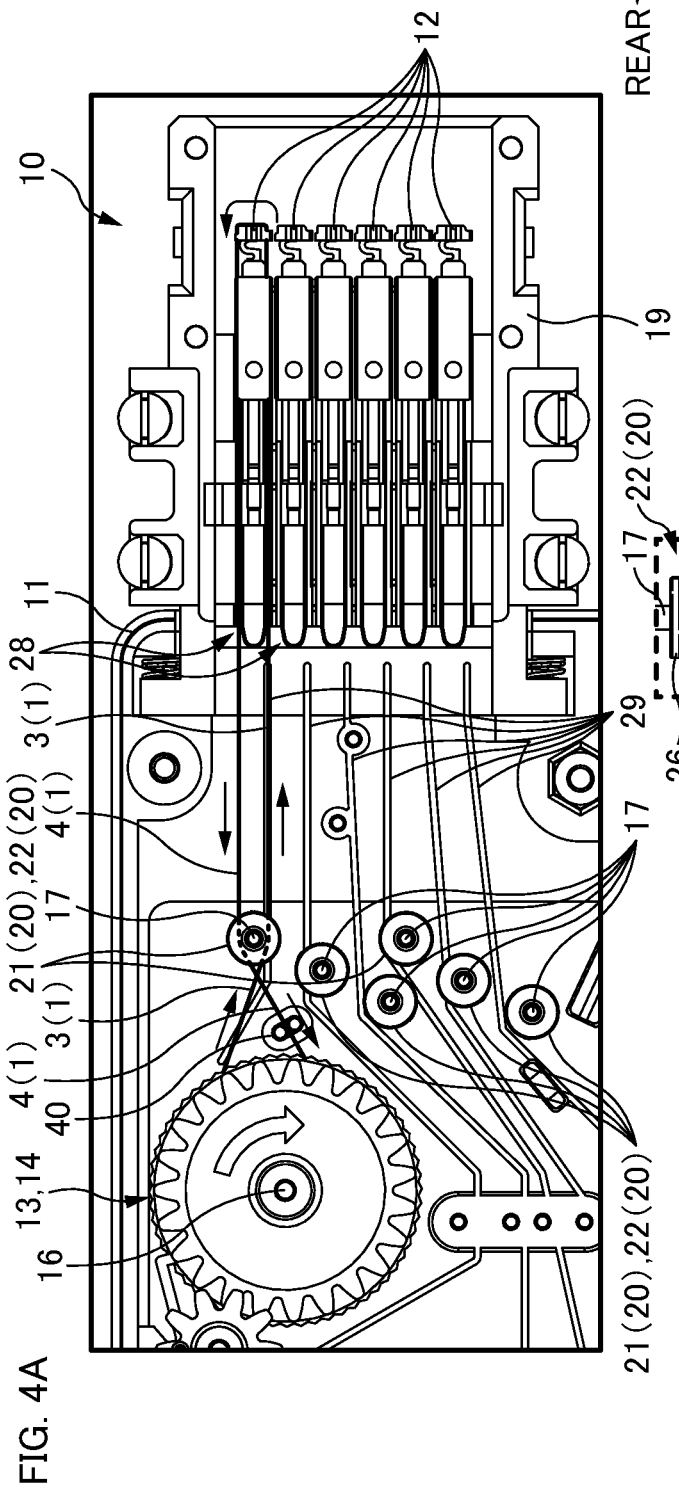
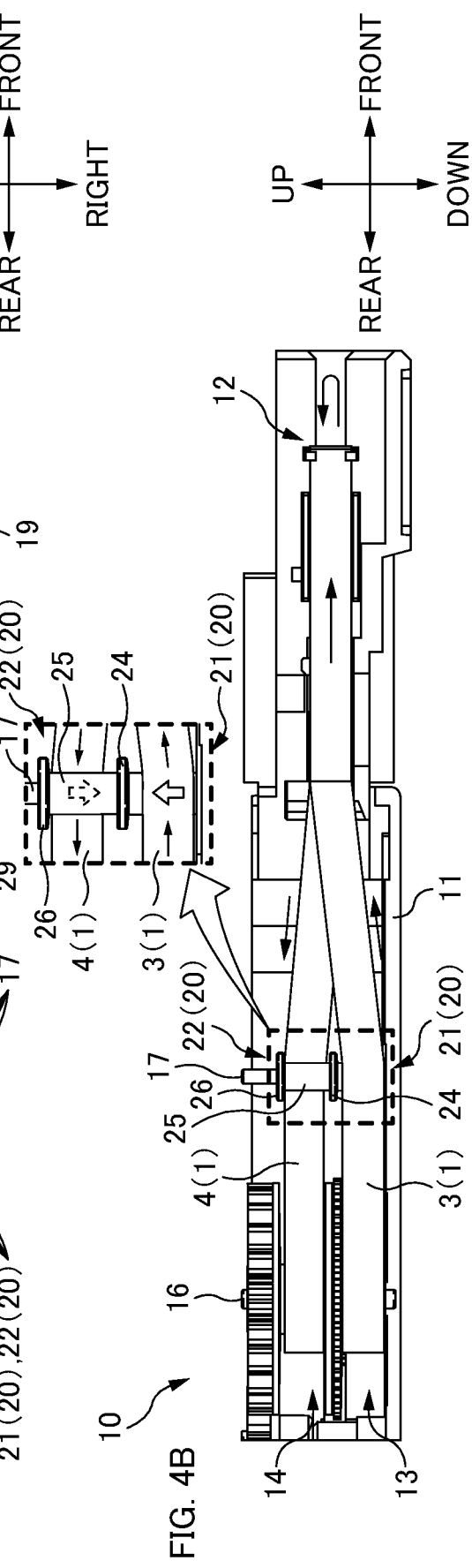
FIG. 4A
FIG. 4B

CLEANING TOOL AND METHOD FOR MANUFACTURING CLEANING TOOL

TECHNICAL FIELD

The present invention relates to a cleaning tool and a method for manufacturing a cleaning tool.

BACKGROUND

When optical connectors are connected, dirt adhering to a connecting end face may cause damage to connecting end faces, and may cause an increase in coupling loss. Thus, the connecting end faces are cleaned by using a cleaning tool before the optical connector is connected.

As such a cleaning tool, for example, Patent Literature 1 and Patent Literature 2 disclose a cleaning tool that cleans a connecting end face of an optical connector with a cleaning element having a tape shape. In the cleaning tool described in Patent Literature 1 and Patent Literature 2, the cleaning element is supplied from a supply reel to a head, and the cleaning element retrieved from the head is reeled by a take-up reel. Patent Literature 1 discloses the cleaning tool provided with a driven roller that guides the cleaning element on a convey path (supply path) of the cleaning element from the supply reel to the head, and on a convey path (retrieve path) of the cleaning element from the head to the take-up reel.

PATENT LITERATURE

Patent Literature 1: JP 2018-128598A
Patent Literature 2: JP 2019-3006A

An edge of a cleaning element conveyed by a driven roller may be bent (folded) (refer to paragraph [0070] in Patent Literature 1, for example). When the cleaning element with a bent edge is reeled by a take-up reel, the cleaning element reeled by the take-up reel becomes bulky, and a diameter of the cleaning element reeled by the take-up reel increases in an early stage.

SUMMARY

One or more embodiments of the present invention is a cleaning tool comprising: a head configured to press a cleaning element having a tape shape onto an optical connector; a take-up reel configured to reel the cleaning element retrieved from the head; a driven roller configured to guide the cleaning element on a convey path from the head to the take-up reel; and a pass-through component with a slit through which the cleaning element is extended, the pass-through component being located between the driven rollers and the take-up reel.

According to one or more embodiments, it is possible to suppress that a cleaning element with a bent edge is reeled by a take-up reel.

BRIEF DESCRIPTION OF DRAWINGS

FIGS. 4A and 4B are explanatory diagrams illustrating a situation where a cleaning element 1 is being conveyed.

DETAILED DESCRIPTION

Figure 1:
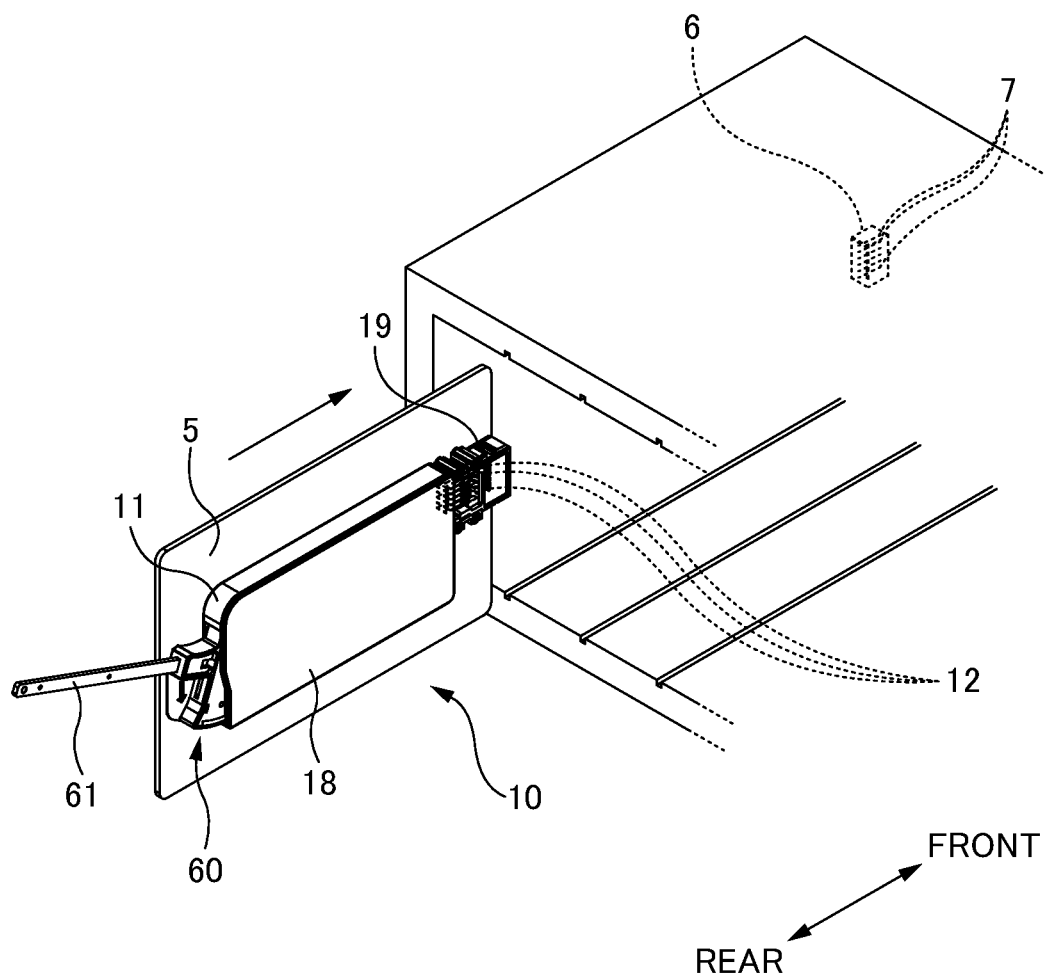
FIG. 1 is an explanatory diagram during cleaning by a cleaning tool 10 according to one or more embodiments.

At least the following matters are made clear from the following description and the drawings.

A cleaning tool will become clear comprising: a head configured to press a cleaning element having a tape shape onto an optical connector; a take-up reel configured to reel the cleaning element retrieved from the head; a driven roller configured to guide the cleaning element on a convey path from the head to the take-up reel; and a pass-through component with a slit through which the cleaning element is extended, the pass-through component being located between the driven rollers and the take-up reel. With such a cleaning tool, it is possible to suppress that the cleaning element with a bent edge is reeled by the take-up reel.

In one or more embodiments, the driven roller consisting of a plurality of driven rollers on the convey path, the plurality of driven rollers being configured to guide the cleaning element, and the pass-through component is located between the take-up reel and a driven roller arranged closest to the take-up reel on the convey path. In this way, it is possible to suppress that the cleaning element with a bent edge is reeled by the take-up reel.

In one or more embodiments, a width of the slit is equal to or greater than a thickness of the cleaning element to be inserted through the slit, and is less than twice the thickness of the cleaning element to be inserted through the slit. In this way, it is possible to suppress that the cleaning element with a bent edge is reeled by the take-up reel.

In one ore more embodiments, the pass-through component includes a first pin and a second pin, and the slit is formed between the first pin and the second pin. In this way, it is possible to suppress that the cleaning element with a bent edge is reeled by the take-up reel.

In one or more embodiments, in a case where a period from when the take-up reel starts reeling the cleaning element until the take-up reel finishes reeling all the cleaning element includes a first period including a point in time when reeling of the cleaning element starts, and a second period, starting from a predetermined point in time, including a point in time when reeling of all the cleaning element finishes, the cleaning element is conveyed while being in contact with the first pin in the first period, and the cleaning element is conveyed while being in contact with the second pin in the second period. In this way, a convey path of the cleaning element from the driven roller to the take-up reel via the pass-through component can be shortened regardless of a reeling diameter of the cleaning element.

In one or more embodiments, the driven roller includes a cylindrical part configured to come in contact with a tape surface of the cleaning element, and a flange part protruding from the cylindrical part. It is particularly advantageous in such a case.

In or more embodiments, the cleaning tool further comprises a supply reel configured to supply the cleaning element to the head, wherein the driven roller includes a supply-side driven roller configured to guide the cleaning element on a convey path from the supply reel to the head, and a retrieve-side driven roller configured to guide the cleaning element on a convey path from the head to the take-up reel, the supply-side driven roller and the retrieve-side driven roller are rotatably arranged on a common rotation shaft, one driven roller of the supply-side driven roller and the retrieve-side driven roller includes a first cylindrical part configured to come in contact with a tape surface of the cleaning element and a flange part protruding from the first cylindrical part, and another driven roller includes a second cylindrical part configured to come in contact with the tape surface of the cleaning element, and a recessed part is formed in a side surface of the flange part of the one driven roller, and an end part of the second cylindrical part of the another driven roller is inserted into the recessed part. In this way, it is possible to suppress a bend in an edge of the cleaning element to be conveyed due to entry of the cleaning element into a gap between the driven rollers.

A method for manufacturing a cleaning tool for cleaning an optical connector will become clear, the cleaning tool including a head configured to press a cleaning element having a tape shape onto the optical connector, a take-up reel for reeling the cleaning element retrieved from the head, one or more driven rollers, each being configured to guide the cleaning element on a convey path from the head to the take-up reel, and a pass-through component with a slit through which the cleaning element is extended, the pass-through component being located between the driven rollers and the take-up reel, the method comprising: rotatably arranging the driven roller on a rotation shaft; and inserting the cleaning element through the pass-through component. With such a method for manufacturing a cleaning tool, it is possible to suppress that the cleaning element with a bent edge is reeled by the take-up reel.

FIG. 1 is an explanatory diagram during cleaning by a cleaning tool 10 according to one or more embodiments.

Figure 2:
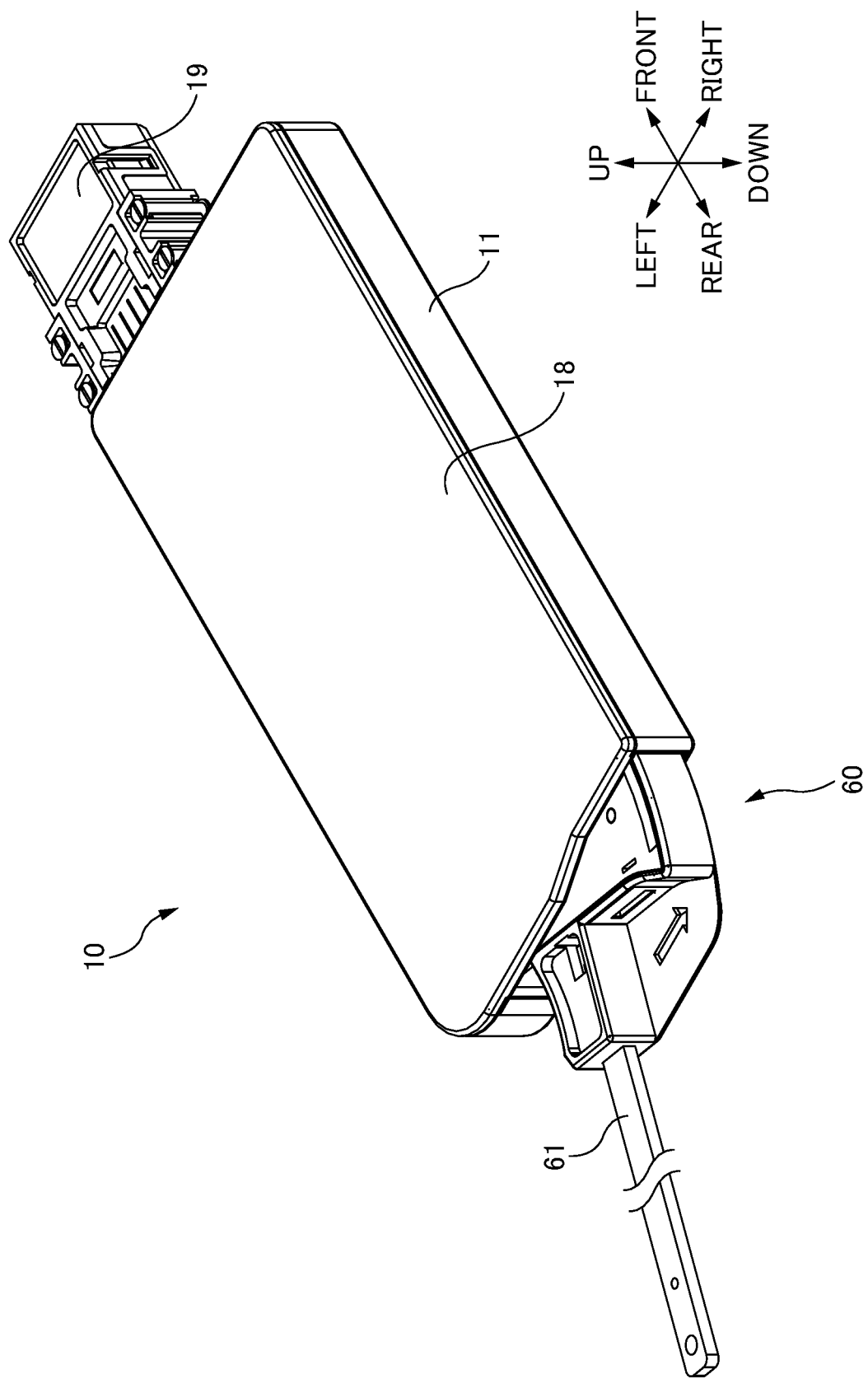
FIG. 2 is a perspective view of the cleaning tool 10 according to one or more embodiments.
Figure 3:
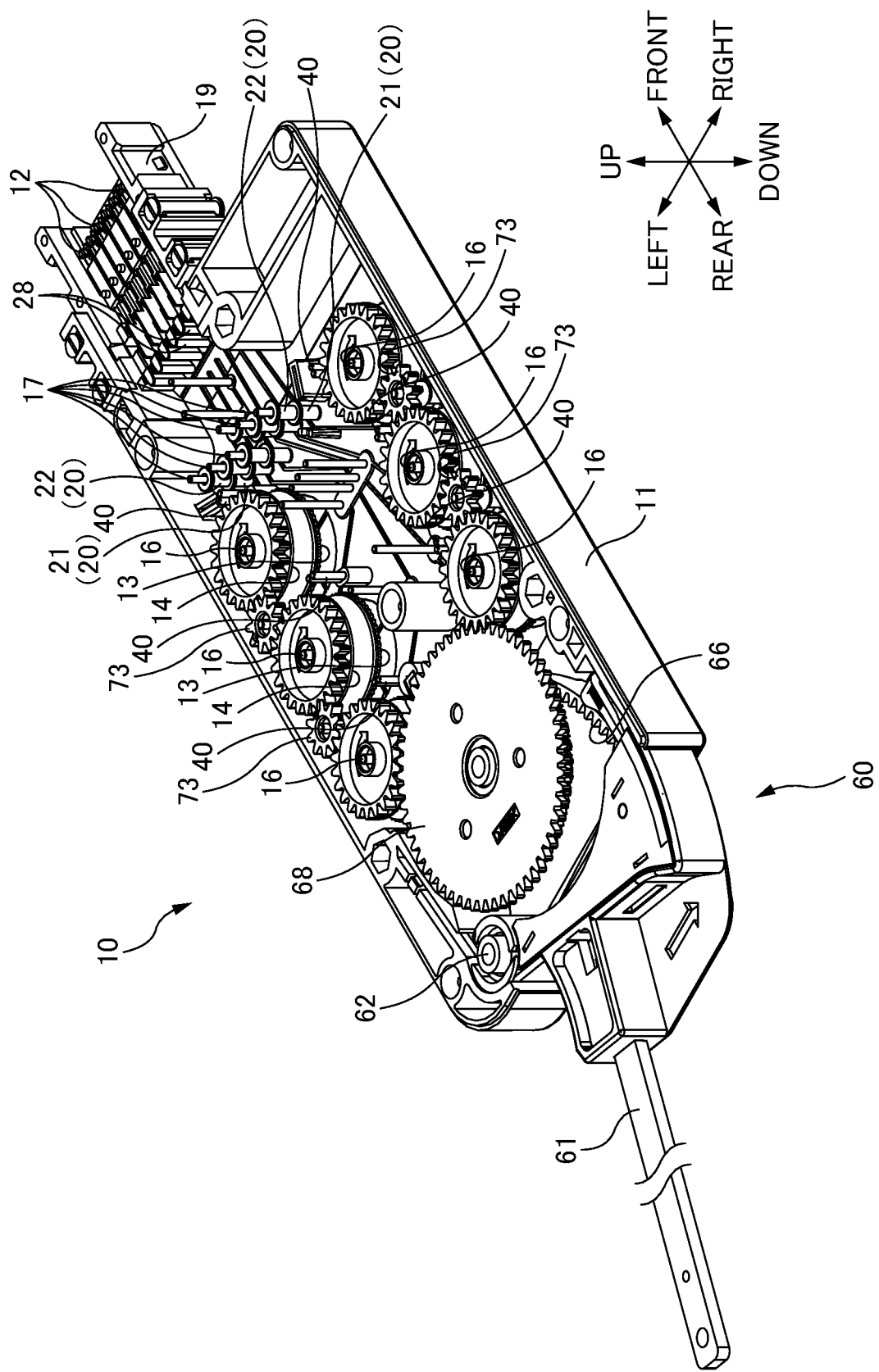
FIG. 3 is a perspective view of the cleaning tool 10 according to one or more embodiments with a lid 18 removed.

FIG. 2 is a perspective view of the cleaning tool 10 according to one or more embodiments. FIG. 3 is a perspective view of the cleaning tool 10 according to one or more embodiments with a lid 18 removed.

Hereinafter, description may be given according to a direction illustrated in the drawings. Specifically, as illustrated in FIG. 1, a direction in which the cleaning tool 10 is moved with respect to a cleaning target (a backplane-side optical connector 7) is defined as a "front-rear direction", a side facing the cleaning target when viewed from a head 12 is defined as "front", and an opposite side of the front is defined as "rear". As illustrated in FIG. 3, a shaft direction of a reel rotation shaft 16 is defined as an "up-down direction", a side facing a take-up reel 14 when viewed from a supply reel 13 is defined as "upside", and an opposite side of the up is defined as "downside". Note that the up-down direction is also a width direction of a cleaning element to be conveyed. A direction perpendicular to the front-rear direction and the up-down direction is defined as a "left-right direction", a right side when a front side is viewed from a rear side is defined as "right", and a left side is defined as "left".

Hereinafter, some terms used in the present application will be described. A "supply path" of a cleaning element is a convey path of the cleaning element from a supply reel to a head in a cleaning tool. A "retrieve path" of the cleaning element is a convey path of the cleaning element from the head to a take-up reel in the cleaning tool. "Upstream" of the convey path is a side closer to the supply reel in a convey direction of a cleaning element 1. "Downstream" of the convey path is a side closer to the take-up reel in the convey direction of the cleaning element 1. A "tape surface" of the cleaning element may indicate a surface, on a side pressed onto a cleaning target, of surfaces of the cleaning element formed in a tape shape, a surface on a side opposite to the side pressed onto the cleaning target, or both of the surfaces.

The cleaning tool 10 is a tool used for cleaning an optical connector. The optical connector as a cleaning target of the cleaning tool 10 according to one or more embodiments is, for example, a backplane connector. The backplane connector is a plug-in optical connector that connects a plurality of backplane-side optical connectors on a backplane board side and a plurality of printed board-side optical connectors on a printed board side to each other, and constitutes an optical connector adapter. However, the optical connector as a cleaning target of the cleaning tool 10 according to one or more embodiments may be other than the backplane connector.

As illustrated in FIG. 1, in a backplane connector, a plurality of (here, six) backplane-side optical connectors 7, and a backplane housing 6 that houses the plurality of backplane-side optical connectors 7 are attached to a connector attachment wall (backplane board) located in the back of a plug-in unit. In the backplane connector, a plurality of (here, six) printed board-side optical connectors, and a printed board housing that houses the plurality of printed board-side optical connectors are attached to a printed board (not illustrated). Then, the printed board is moved by being slid toward a backplane board to fit the printed board housing to the backplane housing 6, and thus the plurality of backplane-side optical connectors 7 and the plurality of printed board-side optical connectors can be connected to each other. Note that the number of the backplane-side optical connectors 7 may be other than six. The number of the printed board-side optical connectors may also be other than six as long as the number corresponds to the number of the backplane-side optical connectors 7.

As illustrated in FIG. 1, in one or more embodiments, the cleaning tool 10 is attached to a substrate 5 instead of the printed board. In the cleaning tool 10, the cleaning element 1 having a tape shape is wrapped around a front end surface of each of a plurality of (here, six) heads 12. Then, the cleaning tool 10 is brought close to the backplane-side optical connector 7 as a cleaning target, and a housing (head housing 19) that houses the head 12 fits with the backplane housing 6, and thus the cleaning element 1 wrapped around each of the plurality of heads 12 is pressed onto a connecting end face of the backplane-side optical connector 7, and can clean the backplane-side optical connector 7.

Figure 7A:
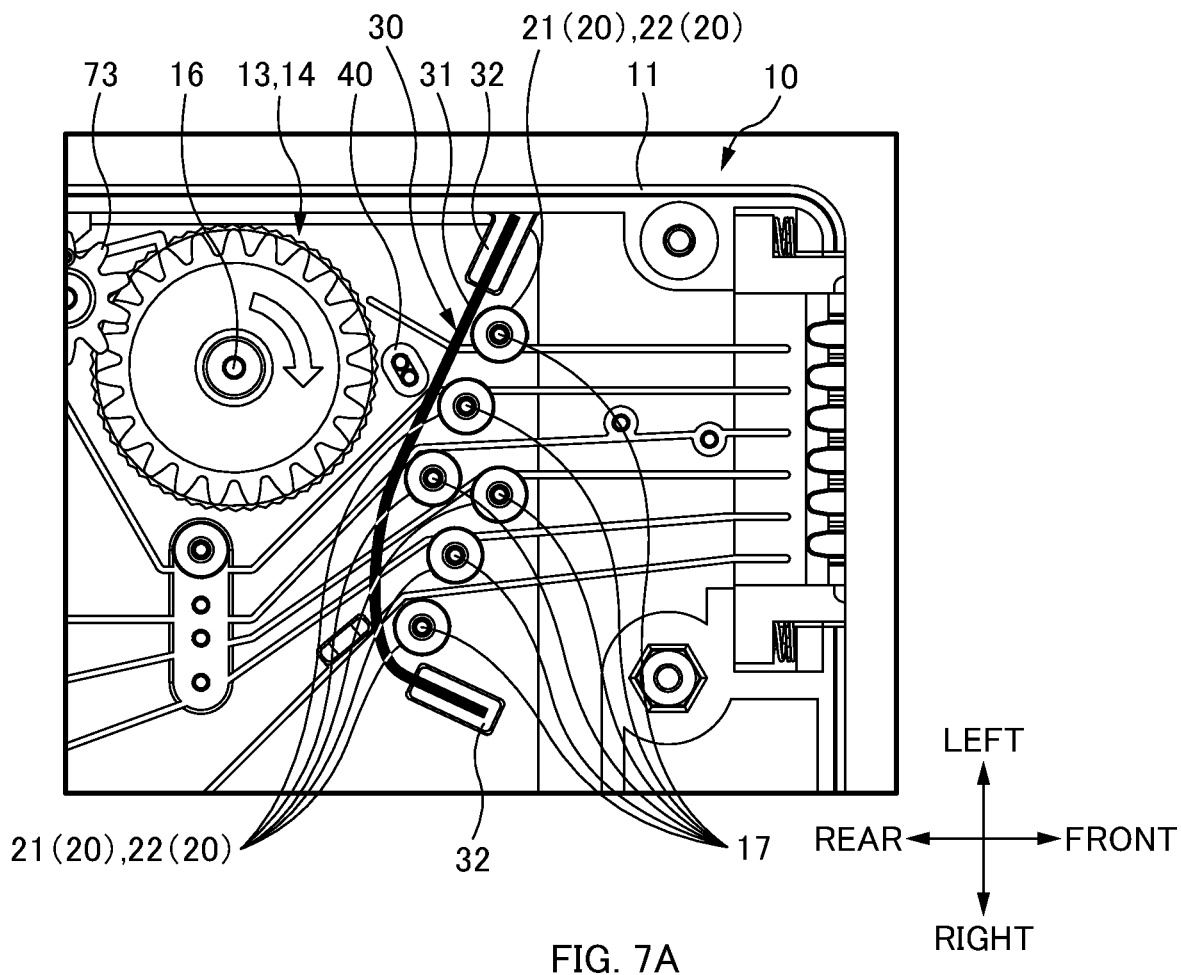
FIGS. 7A and 7B are explanatory diagrams illustrating a partition 30 according to one or more embodiments.
Figure 7B:
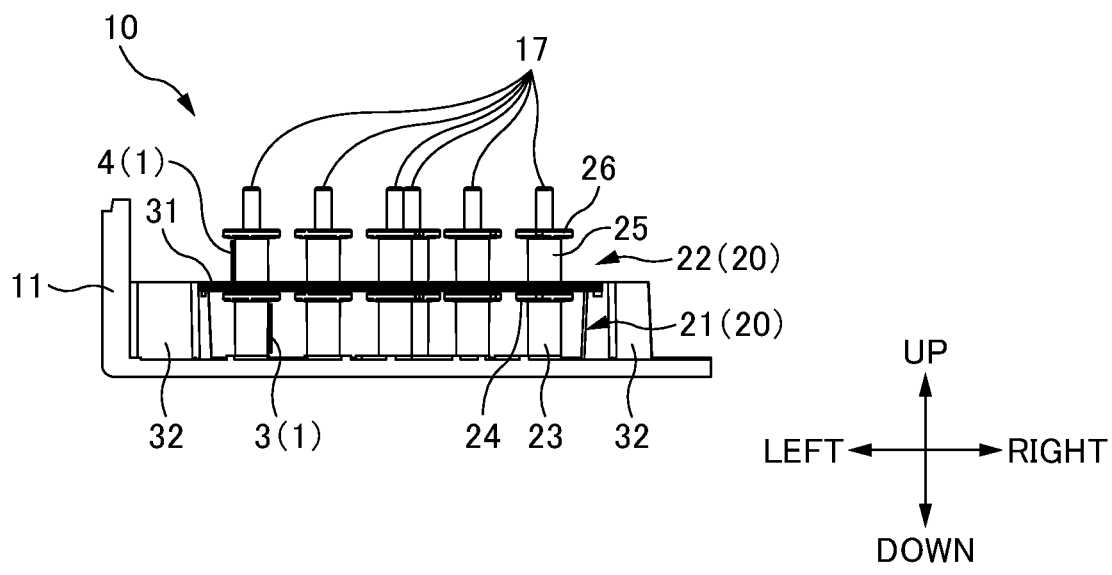

As illustrated in FIGS. 2 and 3, the cleaning tool 10 includes a housing 11, the head 12, the supply reel 13, the take-up reel 14, a driven roller 20, a partition 30, a pass-through component 40, and a driving unit 60 (refer to FIGS. 7A and 7B for the partition 30, which is not illustrated in FIGS. 2 and 3). Note that, hereinafter, the configuration of the cleaning tool 10 other than the housing 11 and the head 12, i.e., the supply reel 13, the take-up reel 14, the driven roller 20, the partition 30, the pass-through component 40, and the driving unit 60 together may be referred to as a "body part".

The housing 11 is a member that houses the body part therein. Note that, as illustrated in FIGS. 2 and 3, a part (for example, a driving lever 61) of the driving unit 60 is exposed from the housing 11. In this way, an operator can operate the driving unit 60 by hand. As illustrated in FIG. 2, a section on an upper surface side of the housing 11 is formed as the lid 18. As illustrated in FIG. 3, the body part housed in the housing 11 will be exposed by removing the lid 18.

The housing 11 is provided with the reel rotation shaft 16 that rotatably supports the supply reel 13 and the take-up reel 14. The housing 11 is provided with a driven roller rotation shaft 17 that rotatably supports the driven roller 20. The reel rotation shaft 16 and the driven roller rotation shaft 17 are arranged such that a direction of each of the shafts is in the up-down direction.

The head 12 is a member that presses the cleaning element 1 onto a connecting end face of an optical connector as a cleaning target of the cleaning tool 10. The front end surface of the head 12 is a pressing surface for pressing the cleaning element 1 onto a connecting end face of an optical connector. The cleaning element 1 is wrapped around the front end surface of the head 12, and an unused portion of the cleaning element 1 is supplied to the head 12 and a used portion of the cleaning element 1 is retrieved from the head 12.

It is already described that the plurality of (here, six) backplane-side optical connectors 7 are arranged in the backplane connector as a cleaning target of the cleaning tool 10 according to one or more embodiments. Thus, the cleaning tool 10 according to one or more embodiments includes the plurality of (here, six) heads 12 corresponding to the number of the backplane-side optical connectors 7. The plurality of heads 12 are arranged side by side in the left-right direction. Then, the cleaning element 1 is supplied and retrieved for each of the heads 12. However, the number of the heads 12 and an arrangement direction are not limited thereto. For example, only one head 12 may be provided. Note that, as illustrated in FIG. 3, the plurality of heads 12 are housed in the head housing 19.

The supply reel 13 is a member for supplying an unused portion of the cleaning element 1 to the head 12. The unused portion of the cleaning element 1 is reeled around the supply reel 13 in advance. The supply reel 13 is rotatably supported by the reel rotation shaft 16 located in the housing 11. The supply reel 13 is arranged to a downside of the take-up reel 14. However, the supply reel 13 may be arranged to an upside of the take-up reel 14. When the cleaning element 1 is pulled from the head 12 side, the supply reel 13 is rotated by tension of the cleaning element 1, and the cleaning element 1 is supplied from the supply reel 13 to the head 12.

The take-up reel 14 is a member for reeling a used portion of the cleaning element 1 retrieved from the head 12. The take-up reel 14 is rotatably supported by the reel rotation shaft 16 provided in the housing 11. The take-up reel 14 is arranged to an upward side of the supply reel 13. However, the take-up reel 14 may be arranged to a downward side of the supply reel 13. When the take-up reel 14 is rotated by the driving unit 60, the take-up reel 14 reels the used portion of the cleaning element 1 retrieved from the head 12.

As illustrated in FIG. 3, the cleaning tool 10 according to one or more embodiments includes a plurality of sets (here, six sets) of the supply reel 13 that supplies the cleaning element 1 to the head 12 and the take-up reel 14 that reels the cleaning element 1 retrieved from the head 12. Note that the number of sets of the supply reel 13 and the take-up reel 14 may be other than six sets as long as the number of the sets corresponds to the number of the heads 12. In this way, the cleaning element 1 can be supplied and retrieved for each of the plurality of heads 12.

As illustrated in FIG. 3, in the cleaning tool 10 according to one or more embodiments, the supply reel 13 that supplies the cleaning element 1 to the head 12 and the take-up reel 14 that reels the cleaning element 1 retrieved from the head 12 are arranged on a common rotation shaft (reel rotation shaft 16). In this way, an area of the cleaning tool 10 occupying a surface perpendicular to the reel rotation shaft 16 can be reduced, and the size of the cleaning tool 10 can be reduced. When conveying the cleaning element 1, the supply reel 13 and the take-up reel 14 that are arranged on the common reel rotation shaft 16 rotate in the same direction (here, a clockwise direction when the downward side is viewed from the upward side). In this way, it is possible to suppress a resistance due to friction between the supply reel 13 and the take-up reel 14 during rotation. However, when conveying the cleaning element 1, the supply reel 13 and the take-up reel 14 that are arranged on the common reel rotation shaft 16 may be rotatable in directions different from each other.

The driven roller 20 is a member that guides the cleaning element 1 while the driven roller 20 is driven to rotate when the driven roller 20 conveys the cleaning element 1 between the supply reel 13 and the head 12 (a supply path 3 of the cleaning element 1) or between the head 12 and the take-up reel 14 (a retrieve path 4 of the cleaning element 1). The driven roller 20 that guides the cleaning element 1 between the supply reel 13 and the head 12 is a supply-side driven roller 21, and the driven roller 20 that guides the cleaning element 1 between the head 12 and the take-up reel 14 is a retrieve-side driven roller 22. The partition 30 is a member that partitions the supply path 3 of the cleaning element 1 and the retrieve path 4 of the cleaning element 1. The pass-through component 40 is a component that straightens a bend in the cleaning element 1 by the cleaning element 1 passing therethrough. The driving unit 60 is a unit that generates a driving force (rotational force) for reeling the cleaning element 1 around the take-up reel 14. Details of the driven roller 20, the partition 30, the pass-through component 40, and the driving unit 60 will be described later.

Convey Path of Cleaning Element 1

FIGS. 4A and 4B are explanatory diagrams illustrating a situation where the cleaning element 1 is conveyed.

When an optical connector is cleaned by using the cleaning tool 10, an operator brings the cleaning tool 10 close to the optical connector, presses the cleaning element 1 wrapped around the head 12 onto a connecting end face of the optical connector, and drives the driving unit 60 in that state. When the driving unit 60 is driven, the take-up reel 14 rotates in a reeling direction of the cleaning element 1. In this way, a used portion of the cleaning element 1 is reeled by the take-up reel 14, and an unused portion of the cleaning element 1 having a length corresponding to a reeling length is supplied from the supply reel 13.

Hereinafter, a convey path will be described according to a convey direction of the cleaning element 1. FIGS. 4A and 4B illustrate a convey path of the cleaning element 1 conveyed to the head 12 located farthest to the left of the plurality of heads 12 included in the cleaning tool 10. FIGS. 4A and 4B omit illustration of the cleaning element 1 conveyed to the other heads 12.

As illustrated in FIG. 4A, the supply path 3 of an unused portion of the cleaning element 1 starts from the supply reel 13. The supply-side driven roller 21 is arranged midway on the supply path 3 of the cleaning element 1. The supply-side driven roller 21 guides the cleaning element 1 toward the head 12 while the supply-side driven roller 21 is driven to rotate. At this time, the cleaning element 1 fed from the supply reel 13 is in contact with the supply-side driven roller 21 from the right side with respect to the supply-side driven roller 21. Then, the cleaning element 1 guided to the head 12 is wrapped around the front end surface of the head 12 from the right side to the left side. The cleaning element 1 wrapped around the front end surface of the head 12 is pressed onto a connecting end face of an optical connector, and thus cleans the connecting end face of the optical connector.

As illustrated in FIG. 4A, the cleaning element 1 is conveyed to the retrieve-side driven roller 22 on the retrieve path 4 of a used portion of the cleaning element 1. The retrieve-side driven roller 22 is arranged midway on the retrieve path 4 of the cleaning element 1. The retrieve-side driven roller 22 guides the cleaning element 1 toward the take-up reel 14 while the retrieve-side driven roller 22 is driven to rotate. At this time, the cleaning element 1 retrieved from the head 12 is in contact with the retrieve-side driven roller 22 from the left side with respect to the retrieve-side driven roller 22. Note that, as illustrated in FIG. 4A, the cleaning element 1 passes through the pass-through component 40 immediately before the cleaning element 1 is reeled by the take-up reel 14. However, the supply path 3 and the retrieve path 4 of the cleaning element 1 may be other than those described above. For example, the cleaning element 1 may be in contact with the supply-side driven roller 21 from the left side with respect to the supply-side driven roller 21 on the supply path 3 of the cleaning element 1, and the cleaning element 1 may be in contact with the retrieve-side driven roller 22 from the right side with respect to the retrieve-side driven roller 22 on the retrieve path 4 of the cleaning element 1.

FIG. 4B is a diagram of when the convey path (the supply path 3 and the retrieve path 4) of the cleaning element 1 described above is viewed in a direction from the right side to the left side. An enlarged diagram of a portion of the driven roller 20 is illustrated on an upper side of FIG. 4B. With reference to a position of the cleaning element 1 in the up-down direction for the convey path of the cleaning element 1 described above, the cleaning element 1 is conveyed from the supply reel 13 to the take-up reel 14 while the position in the up-down direction is gradually adjusted. In other words, since the supply reel 13 and the take-up reel 14 are arranged alongside each other in a shaft direction (up-down direction) of the reel rotation shaft 16 being the common rotation shaft, the position of the cleaning element 1 in the up-down direction is adjusted from the downward side (supply reel 13 side) to the upward side (take-up reel 14 side) while the cleaning element 1 is conveyed from the supply reel 13 to the take-up reel 14. Therefore, in the driven roller 20 located midway on the convey path, the cleaning element 1 is in a state of being easily shifted in the up-down direction with respect to the driven roller 20. In other words, as illustrated in the enlarged diagram illustrated on the upper side of FIG. 4B, since force is applied to the cleaning element 1 so as to move the cleaning element 1 to the upward side (take-up reel 14 side) in the supply-side driven roller 21 located midway on the supply path 3, the cleaning element 1 is in a state of being easily shifted upward with respect to the supply-side driven roller 21. As illustrated in the enlarged diagram illustrated on the upper side of FIG. 4B, since force is applied to the cleaning element 1 so as to move the cleaning element 1 to the downward side (supply reel 13 side) in the retrieve-side driven roller 22 arranged midway on the retrieve path 4, the cleaning element 1 is in a state of being easily shifted downward with respect to the retrieve-side driven roller 22.

Driven Roller 20

Figure 5A:
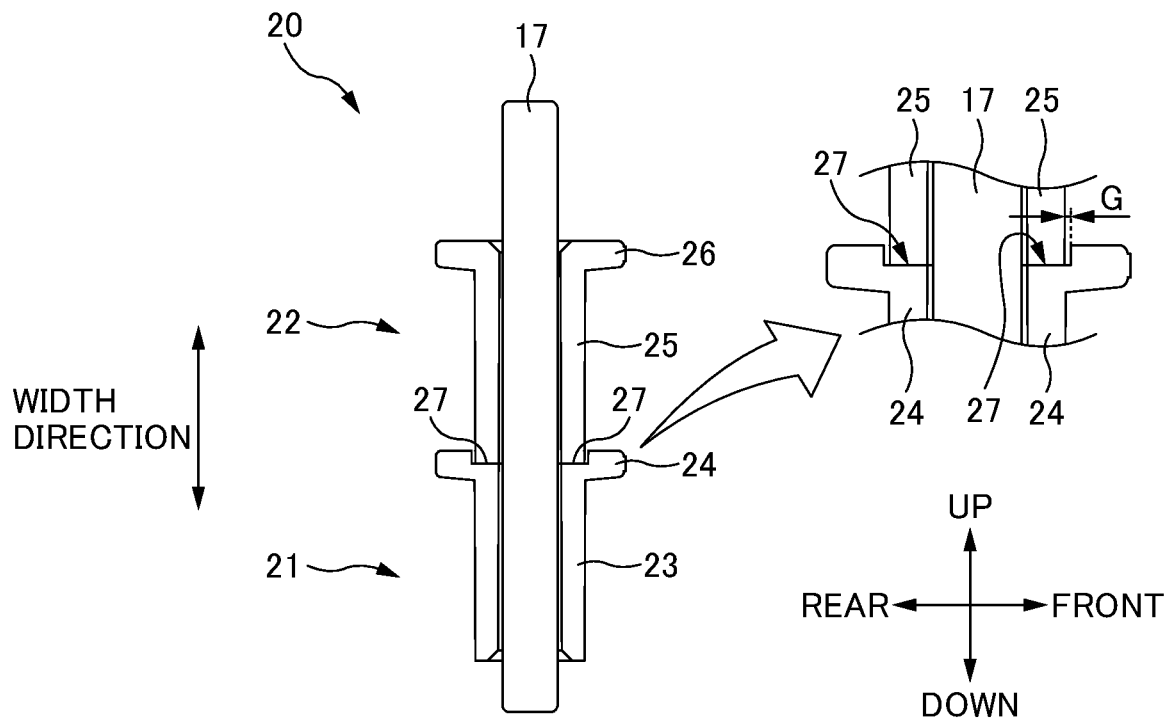
FIG. 5A is a cross-sectional view of a driven roller 20 according to one or more embodiments.
Figure 5B:
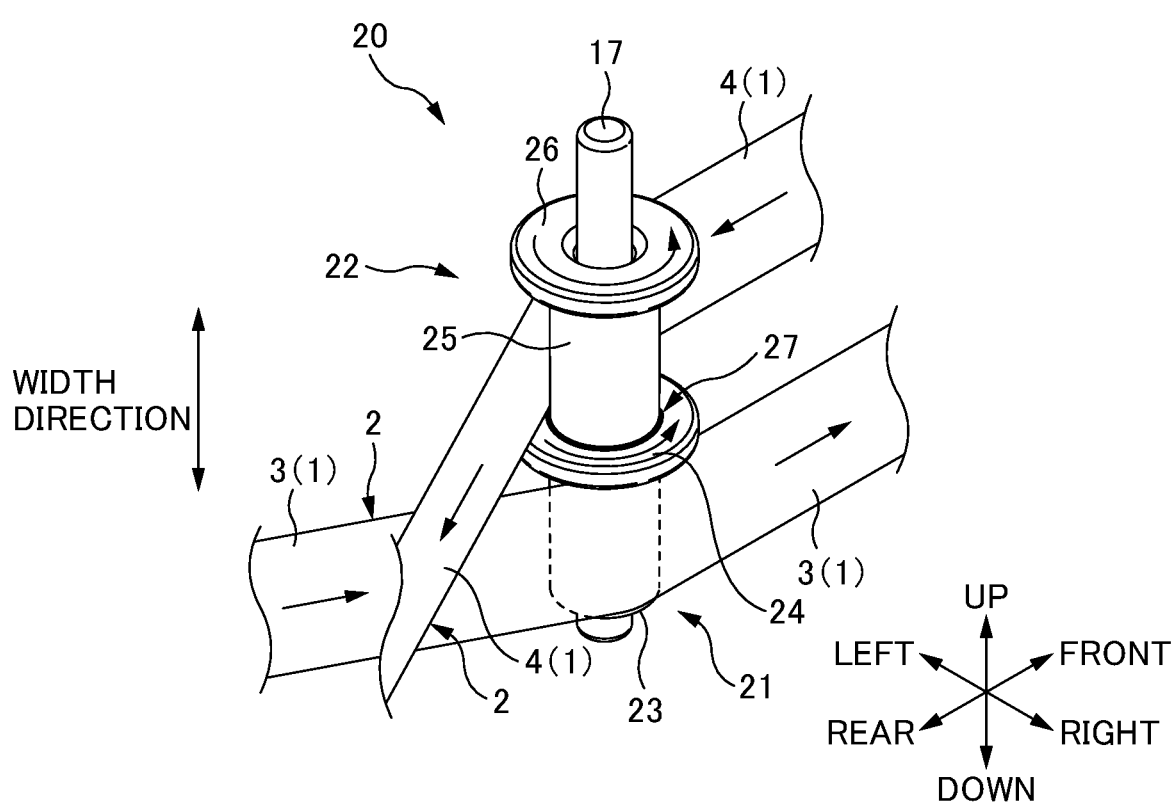
FIG. 5B is an explanatory diagram illustrating a situation where the cleaning element 1 is guided by the driven roller 20 according to one or more embodiments.

FIG. 5A is a cross-sectional view of the driven roller 20 according to one or more embodiments. FIG. 5B is an explanatory diagram illustrating a situation where the cleaning element 1 is guided by the driven roller 20 according to one or more embodiments.

Hereinafter, details of the driven roller 20 will be described while also referring to FIGS. 4A and 4B described above. It has already been described that the driven roller 20 guides the cleaning element 1 while the driven roller 20 is driven to rotate when the driven roller 20 conveys the cleaning element 1 between the supply reel 13 and the head 12 (the supply path 3 of the cleaning element 1) or between the head 12 and the take-up reel 14 (the retrieve path 4 of the cleaning element 1). As illustrated in FIG. 4A, the driven roller 20 is provided midway on the supply path 3 or midway on the retrieve path 4, and thus a direction in which the cleaning element 1 is conveyed can be converted at the driven roller 20 as a border. At this time, the driven roller 20 is driven to rotate, and thus friction between the cleaning element 1 and the outer surface of the driven roller 20 can be reduced when the direction in which the cleaning element 1 is conveyed is converted.

The driven roller 20 includes the supply-side driven roller 21 and the retrieve-side driven roller 22. Hereinafter, any one of the supply-side driven roller 21 and the retrieve-side driven roller 22 may be simply referred to as the "driven roller 20". When a member/section common to the supply-side driven roller 21 and the retrieve-side driven roller 22 is indicated, both of the supply-side driven roller 21 and the retrieve-side driven roller 22 may be simply referred to as the "driven roller 20".

As illustrated in FIG. 4A, the cleaning tool 10 according to one or more embodiments includes a plurality of sets (here, six sets) of the supply-side driven roller 21 arranged on the supply path 3 of the cleaning element 1 and the retrieve-side driven roller 22 arranged on the retrieve path 4 of the cleaning element 1. Note that the number of sets of the supply-side driven roller 21 and the retrieve-side driven roller 22 may be other than six sets as long as the number of the sets corresponds to the number of the heads 12. In this way, the cleaning element 1 can be guided for each of the plurality of heads 12. With reference to the supply path 3 of one cleaning element 1, only one supply-side driven roller 21 is arranged in the cleaning tool 10 illustrated in FIG. 4A. However, for example, the plurality of supply-side driven rollers 21 may be arranged on the supply path 3 of one cleaning element 1. Similarly, the plurality of retrieve-side driven rollers 22 may be arranged on the retrieve path 4 of one cleaning element 1. In this way, a direction in which the cleaning element 1 is conveyed can be converted for a plurality of times, and a degree of freedom in the convey path of the cleaning element 1 can be increased.

Note that, as illustrated in FIG. 5A, in the cleaning tool 10 according to one or more embodiments, the supply-side driven roller 21 and the retrieve-side driven roller 22 on the convey path of the same cleaning element 1 are arranged on a common rotation shaft (driven roller rotation shaft 17). In this way, an area of the cleaning tool 10 occupying a surface perpendicular to the driven roller rotation shaft 17 can be reduced, and the size of the cleaning tool 10 can be reduced. As illustrated in FIG. 5B, when guiding the cleaning element 1, the supply-side driven roller 21 and the retrieve-side driven roller 22 arranged on the common driven roller rotation shaft 17 rotate in the same direction (here, a counterclockwise direction when viewed from the upward side to the downward side). In this way, it is possible to suppress a resistance due to friction between the supply-side driven roller 21 and the retrieve-side driven roller 22 during rotation.

When guiding the cleaning element 1, the supply-side driven roller 21 and the retrieve-side driven roller 22 arranged on the common driven roller rotation shaft 17 may be rotatable in directions different from each other. In this way, a degree of freedom in the convey path of the cleaning element 1 can also be increased. In other words, as illustrated in FIG. 4A, since the supply-side driven roller 21 and the retrieve-side driven roller 22 are arranged on the common driven roller rotation shaft 17, a direction (here, a rearward direction) of convey of the cleaning element 1 from the head 12 to the retrieve-side driven roller 22 is an opposite direction to a direction (here, a forward direction) of convey of the cleaning element 1 from the supply-side driven roller 21 to the head 12. When the supply-side driven roller 21 and the retrieve-side driven roller 22 rotate in the same direction, as illustrated in FIG. 5B, the cleaning element 1 is in contact with the supply-side driven roller 21 from the right side with respect to the supply-side driven roller 21, and is in contact with the retrieve-side driven roller 22 from the left side with respect to the retrieve-side driven roller 22. In this way, the cleaning element 1 on the supply path 3 and the cleaning element 1 on the retrieve path 4 are in contact with the driven roller 20 from directions opposite to each other with respect to the driven roller 20, and thus the supply-side driven roller 21 and the retrieve-side driven roller 22 can rotate in the same direction when guiding the cleaning element 1. In contrast, when the supply-side driven roller 21 and the retrieve-side driven roller 22 can rotate in directions different from each other, the cleaning element 1 on the supply path 3 and the cleaning element 1 on the retrieve path 4 can also be in contact with the driven roller 20 from the same direction with respect to the driven roller 20. In this way, a degree of freedom in the convey path of the cleaning element 1 can be increased.

The supply-side driven roller 21 is the driven roller 20 that guides the cleaning element 1 on the supply path 3. As illustrated in FIG. 5A, the supply-side driven roller 21 is rotatably supported by the driven roller rotation shaft 17 provided in the housing 11. The supply-side driven roller 21 is arranged to a downward side of the retrieve-side driven roller 22. As illustrated in FIG. 4B, a position of the supply-side driven roller 21 in the up-down direction with respect to the retrieve-side driven roller 22 is the same as a position of the supply reel 13 in the up-down direction with respect to the take-up reel 14. In this way, a position of the cleaning element 1 in the up-down direction does not need to be adjusted on the convey path of the cleaning element 1 between the supply reel 13 and the supply-side driven roller 21. Note that, when a position of the supply-side driven roller 21 in the up-down direction with respect to the retrieve-side driven roller 22 is the same as a position of the supply reel 13 in the up-down direction with respect to the take-up reel 14, the supply-side driven roller 21 may be arranged to an upward side of the retrieve-side driven roller 22.

As illustrated in FIG. 5A, the supply-side driven roller 21 includes a supply-side cylindrical part 23 and a supply-side flange part 24. The supply-side cylindrical part 23 is a section that comes in contact with a tape surface 2 of the cleaning element 1. The supply-side flange part 24 is a section protruding from the supply-side cylindrical part 23. The supply-side flange part 24 is arranged on an upper end part of the supply-side cylindrical part 23. The supply-side driven roller 21 includes the supply-side flange part 24, and thus it is possible to suppress the cleaning element 1 moving to the upward side of the supply-side cylindrical part 23 and coming off the supply-side cylindrical part 23. However, the supply-side driven roller 21 may not include the supply-side flange part 24.

The retrieve-side driven roller 22 is the driven roller 20 that guides the cleaning element 1 on the retrieve path 4. As illustrated in FIG. 5A, the retrieve-side driven roller 22 is rotatably supported by the driven roller rotation shaft 17 located in the housing 11. The retrieve-side driven roller 22 is arranged to an upward side of the supply-side driven roller 21. Note that, when a position of the retrieve-side driven roller 22 in the up-down direction with respect to the supply-side driven roller 21 is the same as a position of the take-up reel 14 in the up-down direction with respect to the supply reel 13, the retrieve-side driven roller 22 may be arranged to a downward side of the supply-side driven roller 21.

As illustrated in FIG. 5A, the retrieve-side driven roller 22 includes a retrieve-side cylindrical part 25 and a retrieve-side flange part 26. The retrieve-side cylindrical part 25 is a section that comes in contact with the tape surface 2 of the cleaning element 1. The retrieve-side flange part 26 is a section protruding from the retrieve-side cylindrical part 25. The retrieve-side flange part 26 is arranged on an upper end part of the retrieve-side cylindrical part 25. The retrieve-side driven roller 22 includes the retrieve-side flange part 26, and thus it is possible to suppress the cleaning element 1 moving to the upward side of the retrieve-side cylindrical part 25 and coming off the retrieve-side cylindrical part 25. However, the retrieve-side driven roller 22 may not include the retrieve-side flange part 26. Note that, in the retrieve-side driven roller 22, the cleaning element 1 is in a state of being easily shifted downward with respect to the retrieve-side driven roller 22 (refer to the enlarged diagram illustrated on the upper side of FIG. 4B), and thus a need for the retrieve-side flange part 26 in the retrieve-side driven roller 22 is smaller than a need for the supply-side flange part 24 in the supply-side driven roller 21.

As illustrated in FIG. 5A, a recessed part 27 is located in a side surface of the supply-side flange part 24. The recessed part 27 is a section into which a lower end part of the retrieve-side cylindrical part 25 of the retrieve-side driven roller 22 is inserted. Note that, as illustrated in FIG. 5A, a gap G is formed between an outer surface of the end part of the retrieve-side cylindrical part 25 inserted into the recessed part 27 and an inner surface of the recessed part 27 facing the outer surface (refer to the enlarged diagram illustrated on a right side of FIG. 5A). In this way, when the supply-side driven roller 21 and the retrieve-side driven roller 22 rotate in directions different from each other, it is possible to suppress a resistance due to friction between the supply-side driven roller 21 and the retrieve-side driven roller 22. Note that, as illustrated in FIG. 5B, the cleaning element 1 in contact with the retrieve-side cylindrical part 25 is conveyed on an upward side of the upper side of the supply-side flange part 24, and thus a lower edge of the cleaning element 1 entering the gap G is suppressed.

First Comparative Example

Figure 6A:
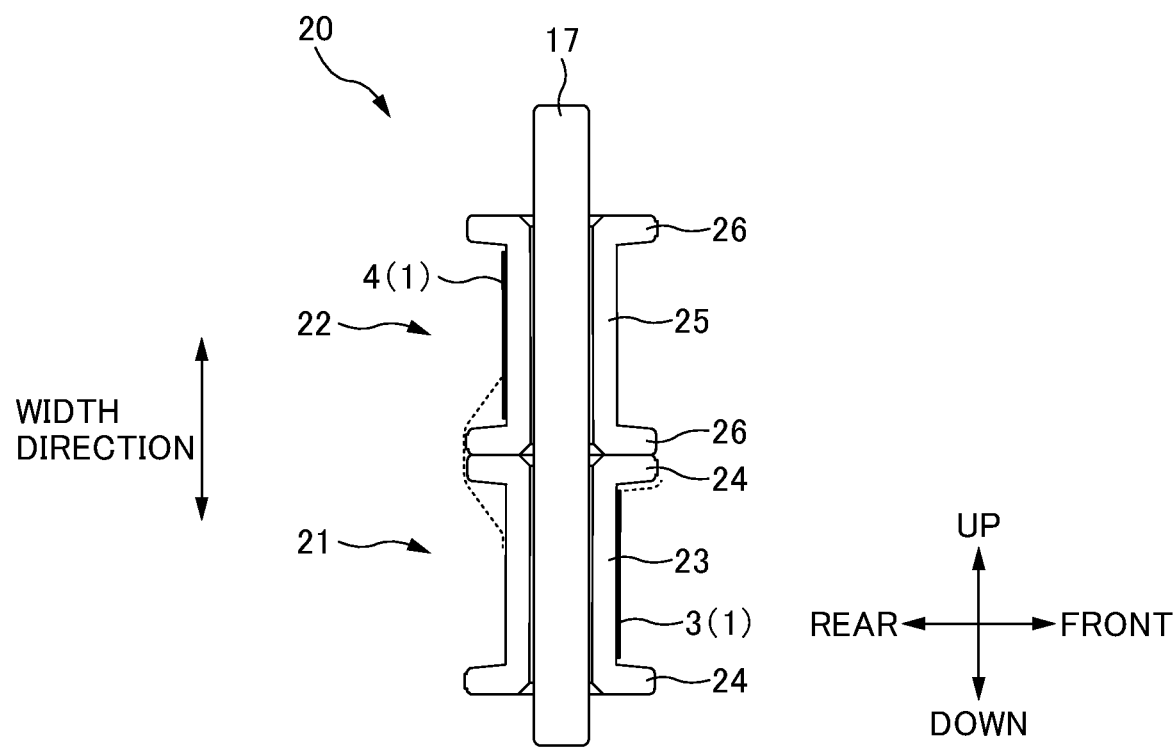
FIG. 6A is a cross-sectional view of a driven roller 20 according to a first comparative example

FIG. 6A is a cross-sectional view of the driven roller 20 according to a first comparative example.

In the driven roller 20 according to the first comparative example, the supply-side flange part 24 is located on both of upper and lower sides of the supply-side cylindrical part 23. In this way, it is possible to suppress the cleaning element 1 moving to both sides of the upward side and the downward side of the supply-side cylindrical part 23 and coming off the supply-side cylindrical part 23. In the driven roller 20 according to the first comparative example, the retrieve-side flange part 26 is also provided on both of upward and downward sides of the retrieve-side cylindrical part 25. In this way, it is possible to suppress the cleaning element 1 moving to both sides of the upper side and the lower side of the retrieve-side cylindrical part 25 and coming off the retrieve-side cylindrical part 25. However, in the first comparative example, a dimension of the supply-side driven roller 21 and the retrieve-side driven roller 22 together in the up-down direction (width direction of the cleaning element 1) is greater than a dimension of the supply-side driven roller 21 and the retrieve-side driven roller 22 together in the up-down direction in one or more embodiments by a thickness of the flange part (the supply-side flange part 24 and the retrieve-side flange part 26). In the first comparative example, a gap between the cleaning element 1 on the supply path 3 and the cleaning element 1 on the retrieve path 4 is also greater than that in one or more embodiments by a thickness of the flange part (the supply-side flange part 24 and the retrieve-side flange part 26). Therefore, in the first comparative example, the cleaning element 1 is more easily shifted upward with respect to the supply-side driven roller 21, and similarly, the cleaning element 1 is more easily shifted downward with respect to the retrieve-side driven roller 22 than one or more embodiments. In this way, as in the cleaning element 1 on the supply path 3 indicated by a broken line in FIG. 6A, the cleaning element 1 may be more easily bent to a side (outside) opposite to the driven roller rotation shaft 17, and, as in the cleaning element 1 on the retrieve path 4 indicated by a broken line in FIG. 6A, the cleaning element 1 may more easily go over the retrieve-side flange part 26 and fall off downward.

Second Comparative Example

Figure 6B:
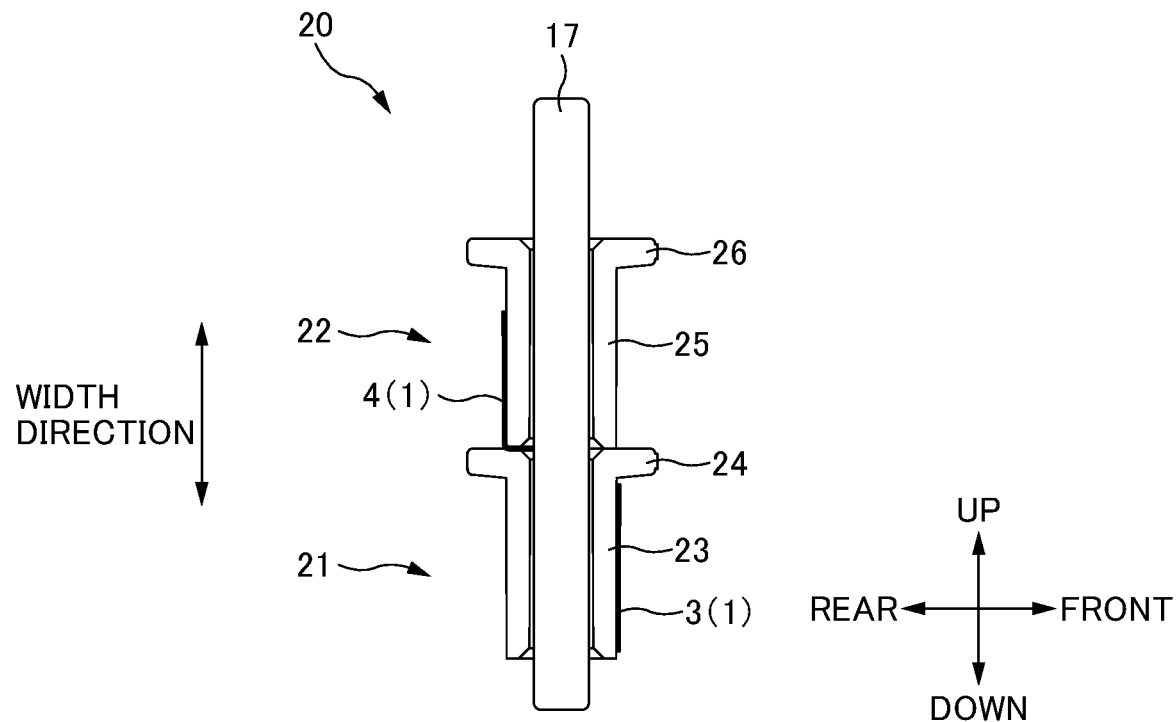
FIG. 6B is a cross-sectional view of a driven roller 20 according to a second comparative example.

FIG. 6B is a cross-sectional view of a driven roller 20 according to a second comparative example.

In the driven roller 20 according to the second comparative example, the supply-side flange part 24 is located only on the upward side of the supply-side cylindrical part 23, and the retrieve-side flange part 26 is located only on the upward side of the retrieve-side cylindrical part 25. Thus, as compared to the driven roller 20 according to the first comparative example, a dimension of the supply-side driven roller 21 and the retrieve-side driven roller 22 together in the up-down direction (width direction of the cleaning element 1) can be reduced by a thickness of the flange part (the supply-side flange part 24 and the retrieve-side flange part 26). Therefore, as compared to the driven roller 20 according to the first comparative example, it is possible to suppress ease with which the cleaning element 1 is shifted upward with respect to the supply-side driven roller 21, and similarly, it is possible to suppress ease with which the cleaning element 1 is shifted downward with respect to the retrieve-side driven roller 22. Therefore, it is possible to suppress the cleaning element 1 being bent to the side (outside) opposite to the driven roller rotation shaft 17, and the cleaning element 1 going over the retrieve-side flange part 26 and falling off downward.

However, in the driven roller 20 according to the second comparative example, the recessed part 27 is not located in the side surface of the supply-side flange part 24. Thus, the end part of the retrieve-side cylindrical part 25 of the retrieve-side driven roller 22 is not inserted into the supply-side driven roller 21 side. Therefore, a gap is present between the supply-side driven roller 21 and the retrieve-side driven roller 22. Thus, as illustrated in FIG. 6B, the cleaning element 1 may enter the gap, and a lower edge of the cleaning element 1 in the width direction may be bent to a side (inside) of the driven roller rotation shaft 17.

In contrast, as illustrated in FIG. 5A described above, in the driven roller 20 according to one or more embodiments, the lower end part of the retrieve-side cylindrical part 25 of the retrieve-side driven roller 22 is inserted into the recessed part 27 of the supply-side driven roller 21, and thus it is possible to suppress a bend in an edge of the cleaning element 1 to be conveyed due to entry of the cleaning element 1 into the gap between the supply-side driven roller 21 and the retrieve-side driven roller 22. In other words, the lower end part of the retrieve-side cylindrical part 25 of the retrieve-side driven roller 22 is inserted into the recessed part 27 of the supply-side driven roller 21, and thus the outer surface of the retrieve-side cylindrical part 25 restricts a bend in the cleaning element 1 even when the lower edge of the cleaning element 1 in the width direction on the retrieve path 4 is to be bent to the side (inside) of the driven roller rotation shaft 17. Therefore, in the driven roller 20 according to one or more embodiments, a gap between the driven rollers 20 that the cleaning element 1 may enter is not located. In other words, it is possible to suppress a bend, to the side (inside) of the driven roller rotation shaft 17, in the lower edge of the cleaning element 1 in the width direction on the retrieve path 4.

Note that a bend in the cleaning element 1 can also be straightened by insertion of the cleaning element 1 on the supply path 3 through an opening 28 (refer to FIGS. 3 and 4A) arranged immediately in front of the head 12. However, when the cleaning element 1 on the retrieve path 4 is bent in the retrieve-side driven roller 22, the cleaning element 1 is reeled by the take-up reel 14 without being inserted through such an opening 28. Accordingly, due to the retrieve-side driven roller 22 being arranged to an upward side of the supply-side driven roller 21, and the recessed part 27 being located in the side surface of the supply-side flange part 24, it is possible to suppress a bend, to the side of the driven roller rotation shaft 17, in the lower edge of the cleaning element 1 in the width direction on the retrieve path 4 in particular. However, due to the supply-side driven roller 21 being arranged to an upward side of the retrieve-side driven roller 22, and the recessed part 27 being located in the side surface of the retrieve-side flange part 26, it is also possible to suppress a bend, to the side of the driven roller rotation shaft 17, in the lower edge of the cleaning element 1 in the width direction on the supply path 3. Note that, as described above, a bend in the cleaning element 1 on the supply path 3 can also be straightened by the opening 28 provided immediately in front of the head 12. Thus, a need to suppress a bend, to the side of the driven roller rotation shaft 17, in the lower edge of the cleaning element 1 in the width direction on the supply path 3 is smaller than a need to suppress a bend, to the side of the driven roller rotation shaft 17, in the lower edge of the cleaning element 1 in the width direction on the retrieve path 4.

Partition 30

FIGS. 7A and 7B are explanatory diagrams illustrating the partition 30 according to one or more embodiments.

As in the cleaning element 1 on the retrieve path 4 indicated by the broken line in FIG. 6A (first comparative example) described above, the cleaning element 1 may similarly go over the retrieve-side flange part 26 on the lower side and fall off in the driven roller 20 according to one or more embodiments. In other words, the retrieve-side flange part 26 is not formed on the lower end part of the retrieve-side cylindrical part 25 in the retrieve-side driven roller 22 according to one or more embodiments, and the cleaning element 1 on the retrieve path 4 may go over the supply-side flange part 24 of the supply-side driven roller 21 located to a downward side of the retrieve-side driven roller 22 and fall off. In the driven roller 20 according to one or more embodiments, similarly to the second comparative example, the supply-side flange part 24 is located only on the upward side of the supply-side cylindrical part 23, and the retrieve-side flange part 26 is located only on the upward side of the retrieve-side cylindrical part 25. Thus, in the driven roller 20 according to one or more embodiments, a gap between the cleaning element 1 on the supply path 3 and the cleaning element 1 on the retrieve path 4 is smaller than that in the driven roller 20 according to the first comparative example. In the driven roller 20 according to one or more embodiments, ease with which the cleaning element 1 is shifted upward with respect to the supply-side driven roller 21 and also ease with which the cleaning element 1 is shifted downward with respect to the retrieve-side driven roller 22 are smaller than that in the driven roller 20 according to the first comparative example. However, in the cleaning tool 10 according to one or more embodiments, when the cleaning element 1 wrapped around the head 12 is pressed onto a connecting end face of an optical connector, the head 12 pushes back. At this time, the cleaning element 1 wrapped around the head 12 is loosened, and thus the cleaning element 1 on the retrieve path 4 may easily go over the supply-side flange part 24 and fall off downward. Accordingly, the partition 30 according to one or more embodiments can suppress such a cleaning element 1 on the retrieve path 4 going over the supply-side flange part 24 and falling off downward. Similarly, the partition 30 according to one or more embodiments can also suppress the cleaning element 1 on the supply path 3 going over the supply-side flange part 24 and falling off upward.

The partition 30 includes a partition member 31 and a partition member supporter 32.

The partition member 31 is a section that partitions the supply path 3 of the cleaning element 1 and the retrieve path 4 of the cleaning element 1. As illustrated in FIGS. 7A and 7B, the partition member 31 is formed in a wire shape. Then, when the partition member 31 formed in a wire shape in such a manner is viewed from the up-down direction (shaft direction of the driven roller rotation shaft 17), the partition member 31 is formed in a direction intersecting the convey direction of the cleaning element 1. Then, the partition member 31 is provided downstream of the retrieve-side driven roller 22 on the retrieve path 4 of the cleaning element 1. In this way, it is possible to suppress the cleaning element 1 going over the supply-side flange part 24 of the supply-side driven roller 21 and thus falling off the supply-side driven roller 21 or the retrieve-side driven roller 22. Note that, as illustrated in FIG. 7A, the partition member 31 is an integrally formed member that partitions the cleaning element 1 on the plurality of (here, six) supply paths 3 and the cleaning element 1 on the plurality of (here, six) retrieve paths 4. In this way, even in the cleaning tool 10 including a plurality of convey mechanisms, one partition 30 can suppress the cleaning element 1 going over the supply-side flange part 24 and thus falling off the supply-side driven roller 21 or the retrieve-side driven roller 22.

The partition member supporter 32 is a section that supports the partition member 31. As illustrated in FIGS. 7A and 7B, the partition member supporter 32 supports end parts on both sides of the partition member 31 formed in a wire shape. As illustrated in FIG. 7B, the partition member supporter 32 supports the partition member 31, and thus a position of the partition member 31 in the up-down direction (shaft direction of the driven roller rotation shaft 17) is located between the supply-side driven roller 21 and the retrieve-side driven roller 22.

Pass-Through Component 40

Figure 8A:
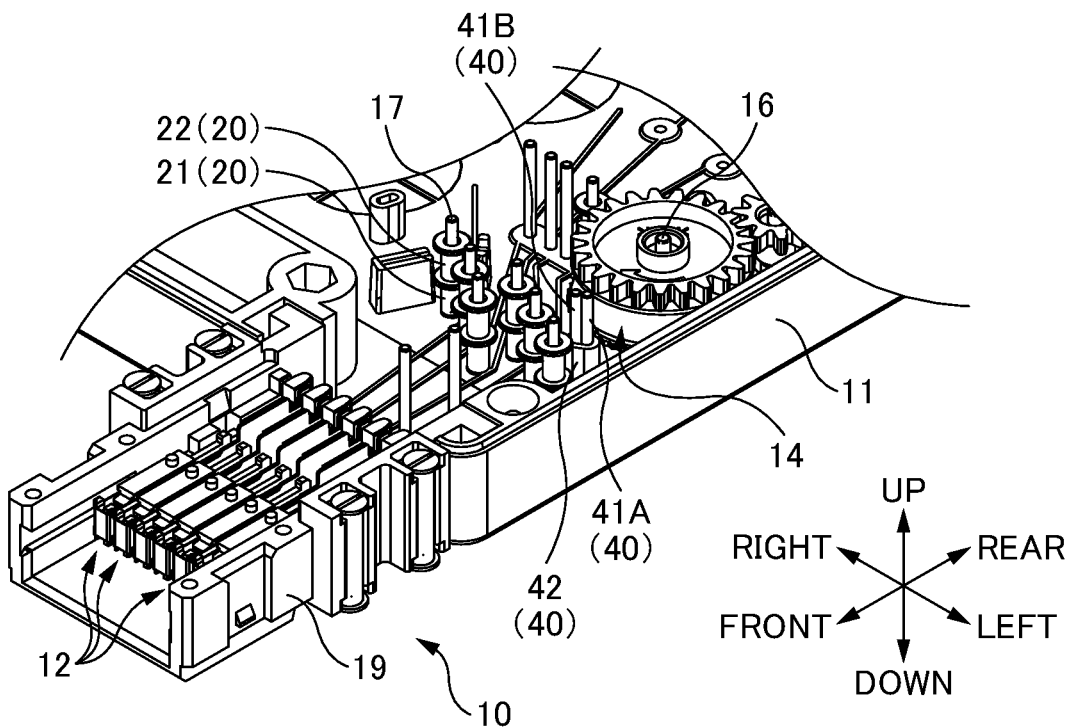
FIG. 8A is an enlarged explanatory diagram of the vicinity of a pass-through component 40 according to one or more embodiments.
Figure 8B:
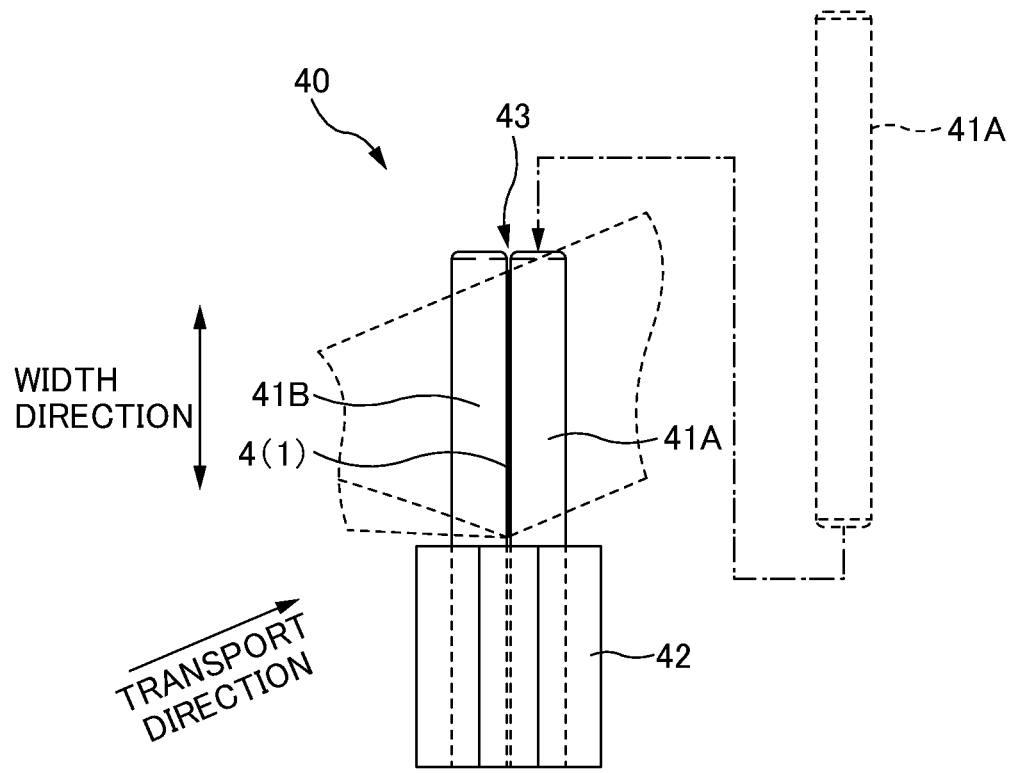
FIG. 8B is a front view of the pass-through component 40 according to one or more embodiments.
Figure 9A:
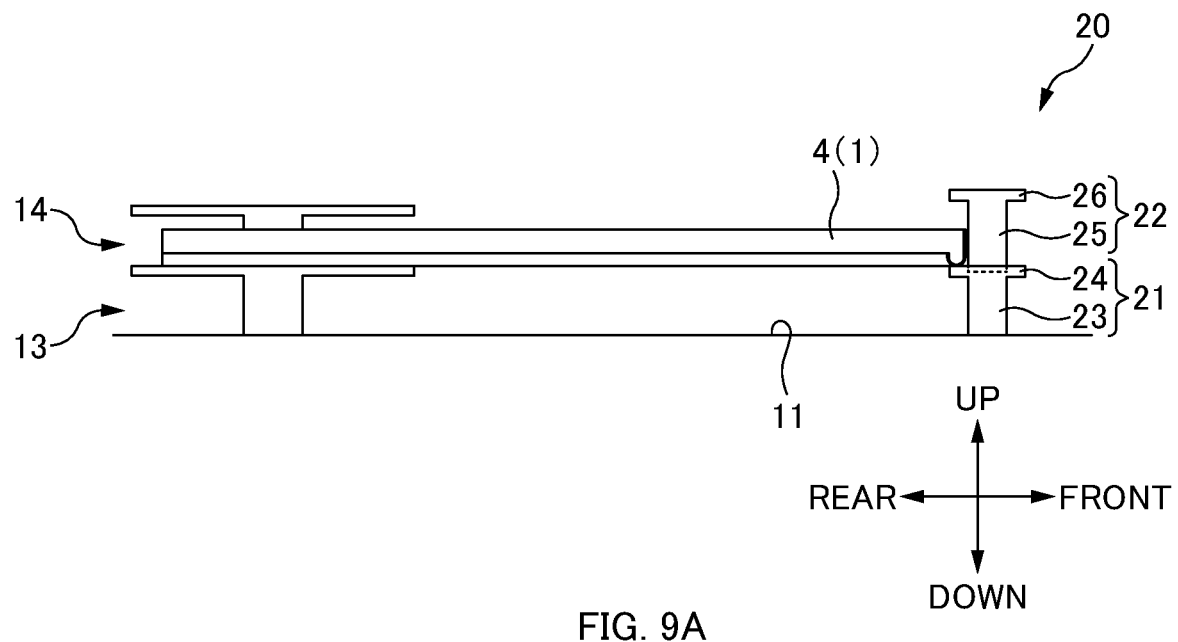
FIG. 9A is a diagram illustrating a situation where the cleaning element 1 with a bent edge is conveyed in a cleaning tool 10 according to a comparative example
Figure 9B:
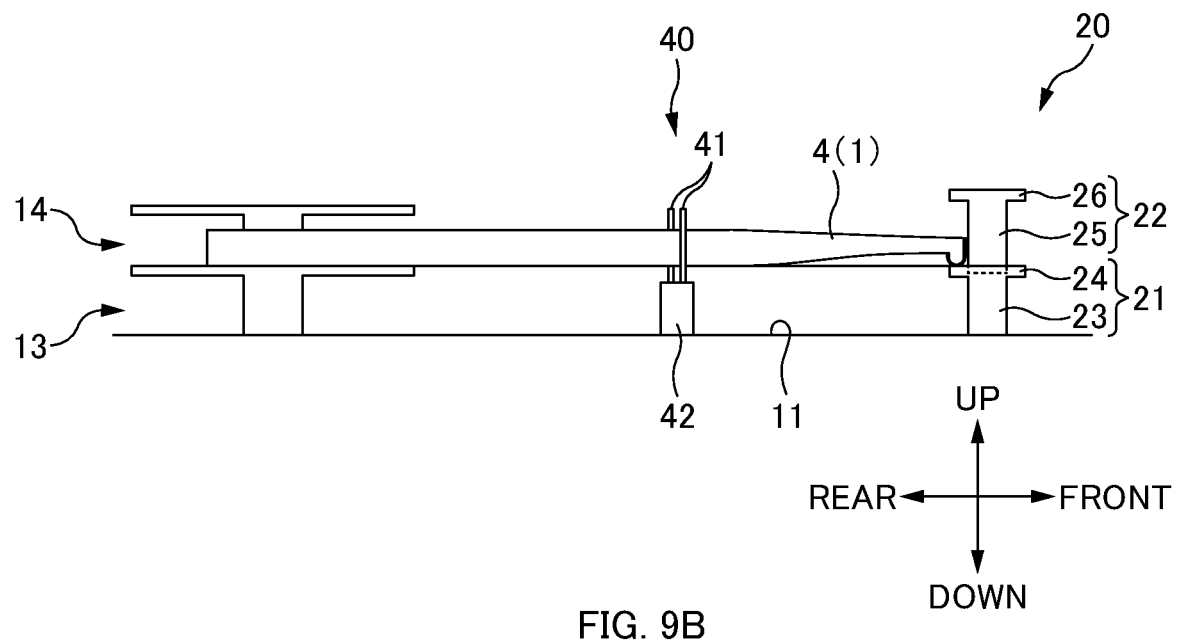
FIG. 9B is a diagram illustrating a situation where the cleaning element 1 with a bent edge is conveyed in the cleaning tool 10 according to one or more embodiments.

FIG. 8A is an enlarged explanatory diagram of the vicinity of the pass-through component 40 according to one or more embodiments. FIG. 8B is a front view of the pass-through component 40 according to one or more embodiments. FIG. 9A is a diagram illustrating a situation where the cleaning element 1 with a bent edge is conveyed in the cleaning tool 10 according to a comparative example FIG. 9B is a diagram illustrating a situation where the cleaning element 1 with a bent edge is conveyed in the cleaning tool 10 according to one or more embodiments. Note that FIGS. 9A and 9B illustrate a cross-sectional view of the cleaning element 1 with a bent edge in the retrieve-side driven roller 22, and do not illustrate the cleaning element 1 on the retrieve path 4 upstream of the edge. FIGS. 9A and 9B do not illustrate the cleaning element 1 on the supply path 3.

In the driven roller 20 according to one or more embodiments described above, it is possible to suppress a bend, to the side (inside) of the driven roller rotation shaft 17, in the lower edge of the cleaning element 1 in the width direction on the retrieve path 4. However, as in the cleaning element 1 on the supply path 3 indicated by the broken line in FIG. 6A (first comparative example) described above, the cleaning element 1 may also be bent to the side (outside) opposite to the driven roller rotation shaft 17 in the driven roller 20 according to one or more embodiments.

In the cleaning tool 10 according to the comparative example illustrated in FIG. 9A, the cleaning element 1 on the retrieve path 4 is bent to the side (outside) opposite to the driven roller rotation shaft 17 in the supply-side flange part 24 located on the upper end part of the supply-side cylindrical part 23. Then, when the cleaning element 1 having an edge being bent in such a manner is reeled by the take-up reel, the cleaning element 1 reeled by the take-up reel 14 becomes bulky, and a reeling diameter of the cleaning element 1 reeled by the take-up reel 14 increases in an early stage. In the cleaning tool 10 according to the comparative example, a used portion of the cleaning element 1 is reeled by the take-up reel 14, and an unused portion of the cleaning element 1 having a length corresponding to the reeled length is supplied from the supply reel 13 (not illustrated). Thus, when a diameter of the cleaning element 1 reeled by the take-up reel 14 increases in an early stage, an excess unused portion of the cleaning element 1 having a length corresponding to a reeling length is supplied. Accordingly, in the cleaning tool 10 according to one or more embodiments, the cleaning element 1 on the retrieve path 4 is inserted through the pass-through component 40, and thus it is possible to suppress reeling of the cleaning element 1 with a bent edge by the take-up reel 14.

As illustrated in FIG. 9B, in the cleaning tool 10 according to one or more embodiments, the pass-through component 40 is located between the retrieve-side driven roller 22 on the retrieve path 4 and the take-up reel 14. Furthermore, the pass-through component 40 is located between the retrieve-side driven roller 22 arranged farthest to a downstream side (take-up reel 14 side) on the retrieve path 4 and the take-up reel 14. In this way, it is possible to suppress reeling of the cleaning element 1 with a bent edge by the take-up reel 14.

As illustrated in FIG. 8B, the pass-through component 40 includes a plurality of (here, two) pins 41 (a pin 41A and a pin 41B), and a pin support part 42. The pins 41 are members that form a slit 43 through which the cleaning element 1 is inserted. The pins 41 include the pin 41A and the pin 41B. As illustrated in FIG. 8B, when the pins 41 are viewed in a direction in which the cleaning element 1 is conveyed from the front to the rear, the pin 41 located on the left side is the pin 41A, and the pin 41 located on the right side is the pin 41B. The pin 41A and the pin 41B are supported by the pin support part 42. The pin 41A and the pin 41B are inserted into an insertion part provided in the pin support part 42, and thus the pin 41A and the pin 41B are fixed to the pin support part 42. The slit 43 is formed between the pin 41A and the pin 41B. The slit 43 is a section through which the cleaning element 1 is inserted, and, as illustrated in FIG. 8B, the cleaning element 1 with a bent edge is inserted through the slit 43, and thus the cleaning element 1 is drawn while being sandwiched between an outer part of the pin 41A and an outer part of the pin 41B, and a bend in the cleaning element 1 can be straightened. In this way, it is possible to suppress reeling of the cleaning element 1 with a bent edge by the take-up reel 14. Note that, hereinafter, the pin 41A may be referred to as a first pin, and the pin 41B may be referred to as a second pin.

In the pass-through component 40 according to one or more embodiments, a width of the slit 43 is equal to or greater than a thickness of the cleaning element 1 inserted through the slit 43, and is less than twice the thickness of the cleaning element 1 inserted through the slit 43. However, a width of the slit 43 may be equal to or greater than twice the thickness of the cleaning element 1 inserted through the slit 43. Even in such a case, when the cleaning element 1 passes through the slit 43, the cleaning element 1 is drawn while being pushed by the outer part of the pin 41A or the outer part of the pin 41B, and a bend in the cleaning element 1 can be straightened.

The pin support part 42 is a member that supports the pin 41A and the pin 41B. The pin support part 42 is fixed to the housing 11. Note that the pin support part 42 may be formed integrally with the housing 11. Therefore, the pin 41A and the pin 41B are fixed to the pin support part 42, and thus the pin 41A and the pin 41B are also fixed to the housing 11.

Figure 10A:
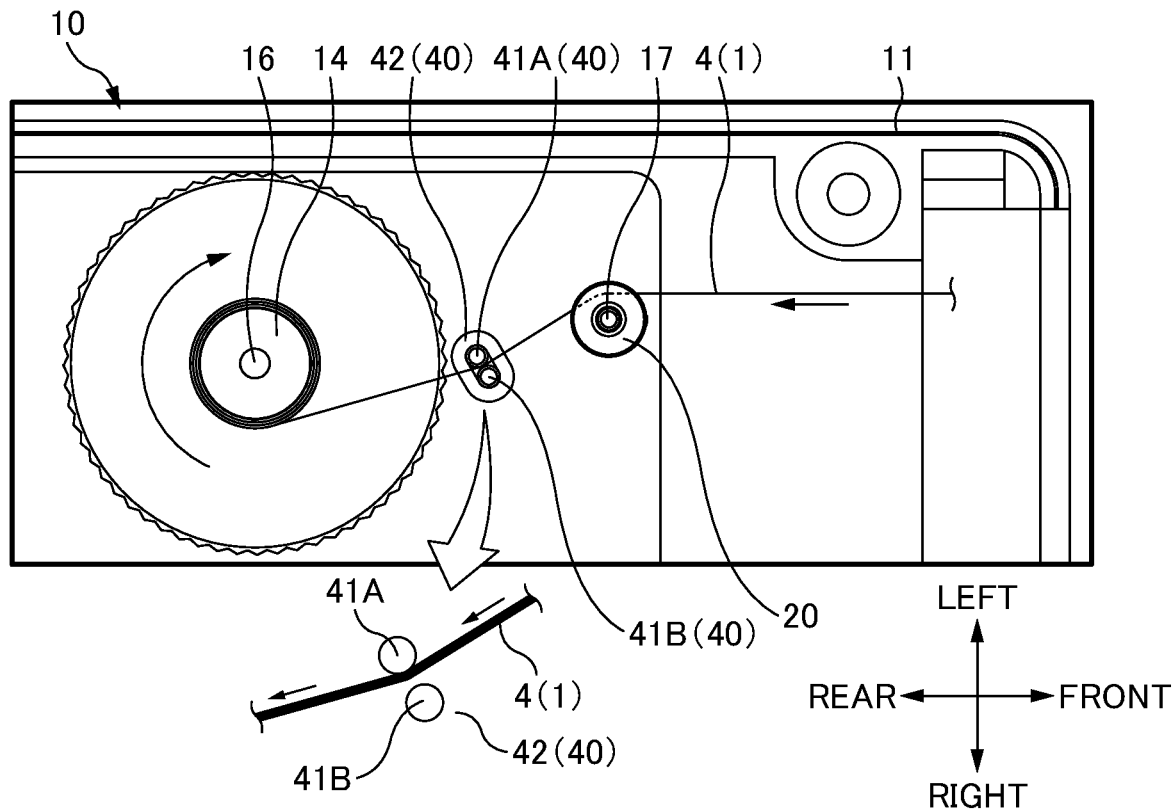
FIG. 10A is an explanatory diagram illustrating a situation where the cleaning element 1 passes through the pass-through component 40 in a first half of reeling.
Figure 10B:
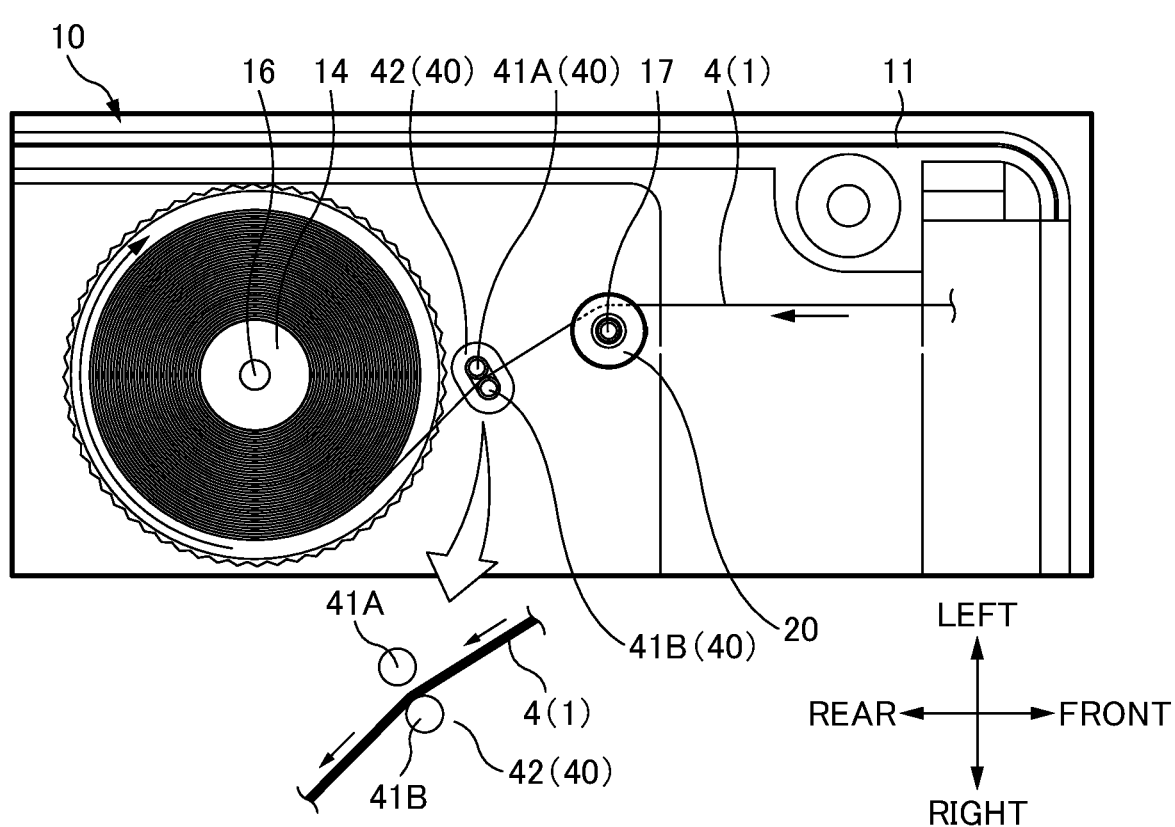
FIG. 10B is an explanatory diagram illustrating a situation where the cleaning element 1 passes through the pass-through component 40 in a second half of reeling.

FIG. 10A is an explanatory diagram illustrating a situation where the cleaning element 1 passes through the pass-through component 40 in a first half of reeling. FIG. 10B is an explanatory diagram illustrating a situation where the cleaning element 1 passes through the pass-through component 40 in a second half of reeling.

The first half of reeling is a period since the take-up reel 14 starts reeling the cleaning element 1 until a predetermined point in time. At the point in time when the take-up reel 14 starts reeling the cleaning element 1, a reeling diameter of the cleaning element 1 in the take-up reel 14 is minimum. For example, at a point in time of assembly (manufacturing) of the cleaning tool 10, i.e., at a point in time when the cleaning tool 10 has never once been used, a reeling diameter of the cleaning element 1 in the take-up reel 14 is minimum. The second half of reeling is a period since the predetermined point in time until the take-up reel 14 finishes reeling all the cleaning element 1. At the point in time when the take-up reel 14 finishes reeling all the cleaning element 1, a reeling diameter of the cleaning element 1 in the take-up reel 14 is maximum. For example, at a point in time when all unused portion of the cleaning element 1 is supplied from the supply reel 13 and the cleaning tool 10 can no longer be used, a reeling diameter of the cleaning element 1 in the take-up reel 14 is maximum. Note that, hereinafter, the first half of reeling may be referred to as a first period, and the second half of the reeling may be referred to as a second period.

As illustrated in FIG. 10A, in the first half of reeling, the cleaning element 1 is conveyed while being in contact with the pin 41A. As illustrated in FIG. 10B, in the second half of reeling, the cleaning element 1 is conveyed while being in contact with the pin 41B. In the cleaning tool 10 according to one or more embodiments, since the take-up reel 14 starts reeling the cleaning element 1 until the take-up reel 14 finishes reeling all the cleaning element 1, a reeling diameter of the cleaning element 1 in the take-up reel 14 gradually increases. Thus, a convey direction of the cleaning element 1 from the pass-through component 40 to the take-up reel 14 gradually changes. Specifically, from the first half of reeling illustrated in FIG. 10A to the second half of reeling illustrated in FIG. 10B, a direction in which the cleaning element 1 is conveyed from the pass-through component 40 to the take-up reel 14 gradually changes so as to face the right side. Therefore, a state where the cleaning element 1 is conveyed while being in contact with the pin 41A in the first half of reeling changes, at a predetermined point in time as a border, to a state where the cleaning element 1 is conveyed while being in contact with the pin 41B in the second half of reeling.

Here, if the cleaning element 1 is to be conveyed while being in contact with only one of the pins 41 (the pin 41A or the pin 41B) from the first half of reeling to the second half of reeling, arrangement of the pass-through component 40 is a matter of concern. In other words, when considering that a convey direction of the cleaning element 1 from the pass-through component 40 to the take-up reel 14 gradually changes so as to face the right side from the first half of reeling to the second half of reeling, in order for the cleaning element 1 to be conveyed while being in contact with only the pin 41A for example, the pass-through component 40 needs to be arranged away to the right side as compared to the cleaning tool 10 according to one or more embodiments illustrated in FIGS. 10A and 10B. In this case, a convey path of the cleaning element 1 from the retrieve-side driven roller 22 to the take-up reel 14 via the pass-through component 40 increases. On the other hand, in order for the cleaning element 1 to be conveyed while being in contact with only the pin 41B for example, the pass-through component 40 needs to be arranged away to the left side as compared to the cleaning tool 10 according to one or more embodiments illustrated in FIGS. 10A and 10B. Also in this case, a convey path of the cleaning element 1 from the retrieve-side driven roller 22 to the take-up reel 14 via the pass-through component 40 increases. However, in the cleaning tool 10 according to one or more embodiments, the cleaning element 1 is conveyed while being in contact with the pin 41A (first pin) in the first half of reeling (first period), and the cleaning element 1 is conveyed while being in contact with the pin 41B (second pin) in the second half of reeling (second period). In this way, regardless of a reeling diameter of the cleaning element 1, a convey path of the cleaning element 1 from the retrieve-side driven roller 22 to the take-up reel 14 via the pass-through component 40 can be shortened.

First Modified Example

Figure 11A:
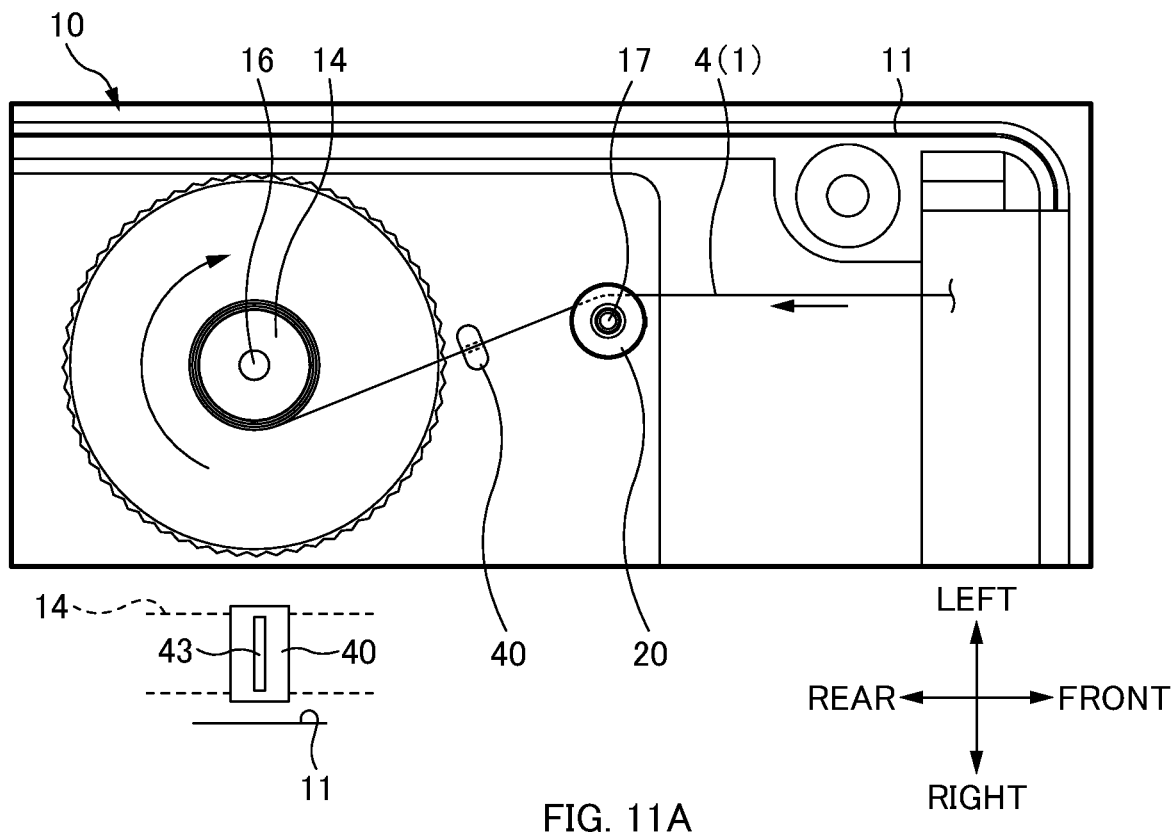
FIG. 11A is an explanatory diagram of a pass-through component 40 according to a first modified example

FIG. 11A is an explanatory diagram of a pass-through component 40 according to a first modified example.

In the pass-through component 40 according to one or more embodiments described above, the slit 43 through which the cleaning element 1 is inserted is formed of the plurality of pins 41. However, the slit 43 through which the cleaning element 1 is inserted may be formed of other than the plurality of pins 41. The pass-through component 40 according to the first modified example illustrated in FIG. 11A is formed of a plate member having the slit 43. Also in this way, the cleaning element 1 with a bent edge is inserted through the slit 43, and thus a bend in the cleaning element 1 can be straightened. Therefore, it is possible to suppress reeling of the cleaning element 1 with a bent edge by the take-up reel 14.

In the pass-through component 40 according to one or more embodiments described above, the plurality of pins 41 forming the slit 43 are fixed to the housing 11 by the pin support part 42. However, the pass-through component 40 may not be fixed to the housing 11. In other words, as in the explanatory diagram illustrated on a lower side of FIG. 11A, the pass-through component 40 according to the first modified example is provided between the retrieve-side driven roller 22 and the take-up reel 14, but is not fixed to the housing 11. The pass-through component 40 according to the first modified example can move to the take-up reel 14 side in the convey direction of the cleaning element 1 on the retrieve path 4. Note that the pass-through component 40 according to the first modified example has a stable position by being in contact with the take-up reel 14.

Second Modified Example

Figure 11B:
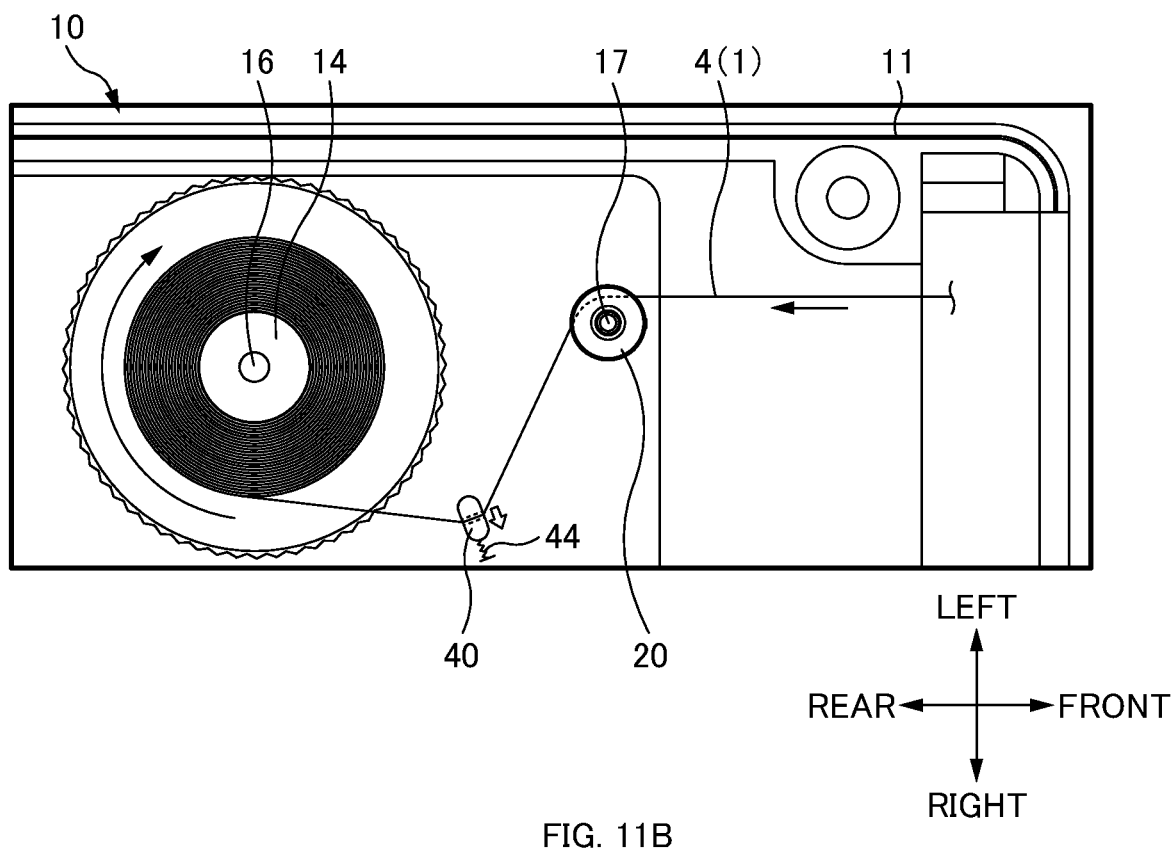
FIG. 11B is an explanatory diagram of a pass-through component 40 according to a second modified example.

FIG. 11B is an explanatory diagram of a pass-through component 40 according to a second modified example.

The pass-through component 40 according to the second modified example illustrated in FIG. 11B is formed of a plate member having the slit 43 similarly to the pass-through component 40 according to the first modified example illustrated in FIG. 11A. However, in the pass-through component 40 according to the second modified example, an elastic member 44 is provided between the pass-through component 40 and the housing 11. Thus, tension is applied, in one direction, to the cleaning element 1 passing through the pass-through component 40. Then, tension is applied, in one direction, to the cleaning element 1 with a bent edge and is inserted through the slit 43 of the pass-through component 40, and thus a bend in the cleaning element 1 can be more effectively straightened. Note that the elastic member 44 is formed of a spring and a plate spring.

Driving Unit 60

Figure 12A:
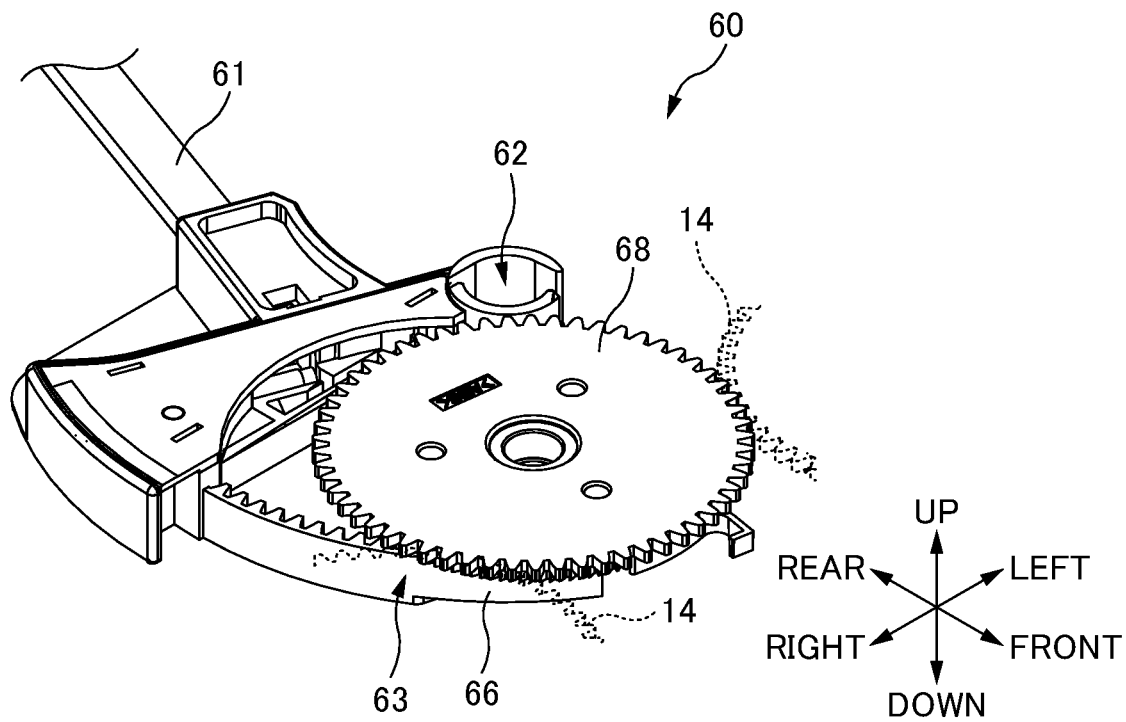
FIGS. 12A and 12B are perspective views of a driving unit 60 according to one or more embodiments.
Figure 12B:
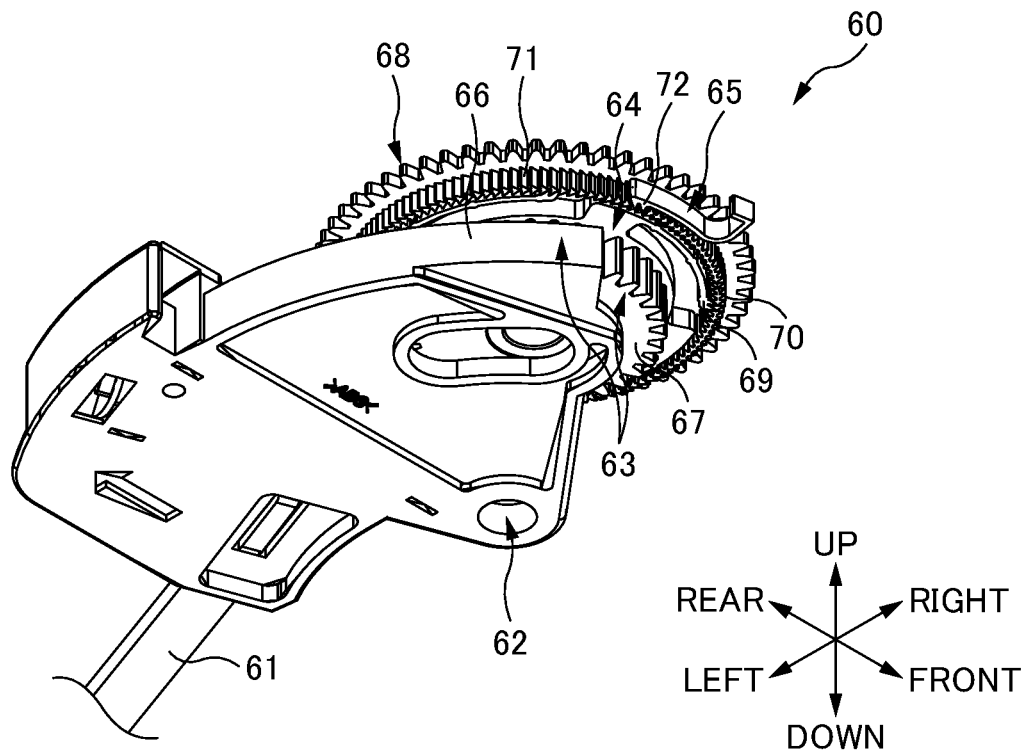

FIGS. 12A and 12B are perspective views of the driving unit 60 according to one or more embodiments. FIG. 12A is a perspective view when the driving unit 60 according to one or more embodiments is looked down from the upper side. FIG. 12B is a perspective view when the driving unit 60 according to one or more embodiments is looked up from the downward side.

The driving unit 60 includes, as a mechanism for generating a driving force (rotational force) for reeling the cleaning element 1 around the take-up reel 14, a conversion mechanism 63, a transmission mechanism 64, and a reverse rotation prevention mechanism 65.

The conversion mechanism 63 is a mechanism for converting a rotational motion (hereinafter may be referred to as an "arc motion") within a certain angle with a driving rotation shaft 62 of the driving lever 61 as the center into a rotational motion of the transmission mechanism 64. Note that the arc motion of the driving lever 61 also includes a rotational motion (oscillation motion) that reciprocates a clockwise rotational motion and a counterclockwise rotational motion with the driving rotation shaft 62 as the center. In the cleaning tool 10 according to one or more embodiments, the conversion mechanism 63 is formed of a rack-and-pinion mechanism, and includes a rack 66 and a pinion 67. The rack 66 is a gear provided inside an arc portion of the driving lever 61, and performs an arc motion with the driving rotation shaft 62 as the center. The pinion 67 is a circular gear provided to the transmission mechanism 64 side. The pinion 67 performs a rotational motion with a rotation shaft of the transmission mechanism 64 as the center when the rack 66 performs an arc motion.

The transmission mechanism 64 is a mechanism for transmitting a rotational motion of the pinion 67 to a rotational motion of a transmission wheel 68. The transmission mechanism 64 includes a transmission claw 69 and an engagement wheel 70. The transmission claw 69 is a member that transmits a rotational force to the engagement wheel 70 by rotating while engaging with the engagement wheel 70. The transmission claw 69 is provided integrally with the pinion 67, and the transmission claw 69 also rotates together with rotation of the pinion 67. The engagement wheel 70 is a member that engages with the transmission claw 69 and receives a rotational force from the transmission claw 69. The engagement wheel 70 is provided integrally with a ratchet 71 of the reverse rotation prevention mechanism 65 and the transmission wheel 68.

The reverse rotation prevention mechanism 65 is a mechanism for restricting a rotational direction of the transmission wheel 68 to one direction (reeling direction of the cleaning element 1 by the take-up reel 14). In other words, the reverse rotation prevention mechanism 65 is a mechanism for preventing the transmission wheel 68 from transmitting a driving force such that the take-up reel 14 rotates in a reverse direction of the reeling direction in which the cleaning element 1 is reeled. In the cleaning tool 10 according to one or more embodiments, the reverse rotation prevention mechanism 65 is formed of a ratchet mechanism, and includes a check claw 72 attached to the housing 11, and the ratchet 71 provided integrally with the transmission wheel 68. When a driving force is transmitted such that the take-up reel 14 rotates in the reeling direction in which the cleaning element 1 is reeled, the check claw 72 permits the ratchet 71 to rotate, and thus the transmission wheel 68 rotates. When a driving force is transmitted such that the take-up reel 14 rotates in the reverse direction of the reeling direction in which the cleaning element 1 is reeled, the check claw 72 anchors the ratchet 71, and thus the transmission wheel 68 does not rotate. Note that the reverse rotation prevention mechanism 65 in the cleaning tool 10 according to one or more embodiments is formed of an external tooth ratchet mechanism, but the reverse rotation prevention mechanism 65 may be an internal tooth ratchet mechanism and may be other than a ratchet mechanism as long as the reverse rotation prevention mechanism 65 is a mechanism capable of preventing a reverse rotation of the transmission wheel 68.

Therefore, the cleaning tool 10 according to one or more embodiments includes the rack 66 and the pinion 67, as the conversion mechanism 63 for generating a driving force (rotational force) for the transmission wheel 68 that transmits rotation such that the cleaning element 1 is reeled by the take-up reel 14. Then, the cleaning tool 10 includes the transmission claw 69 and the engagement wheel 70, as the transmission mechanism 64 for transmitting a rotational force generated in the pinion 67 to the transmission wheel 68. Since the transmission wheel 68 is provided integrally with the engagement wheel 70, the transmission wheel 68 also rotates together with rotation of the engagement wheel 70. Then, in the cleaning tool 10 according to one or more embodiments, the transmission wheel 68 is provided so as to transmit a rotational force to the take-up reel 14. Furthermore, as illustrated in FIG. 3 described above, a driving force (rotational force) is generated in a total of the six take-up reels 14 via a coupling gear 73. In other words, the transmission wheel 68 is common to the six take-up reels 14. In this way, as compared to a case where the reverse rotation prevention mechanism 65 is provided on each of the take-up reels 14, an area of the cleaning tool 10 occupying a surface perpendicular to the up-down direction can be reduced, and the size of the cleaning tool 10 can be reduced. However, the coupling gear 73 may not be provided.

Method for Assembling (Method for Manufacturing) Cleaning Tool 10

Figure 13:
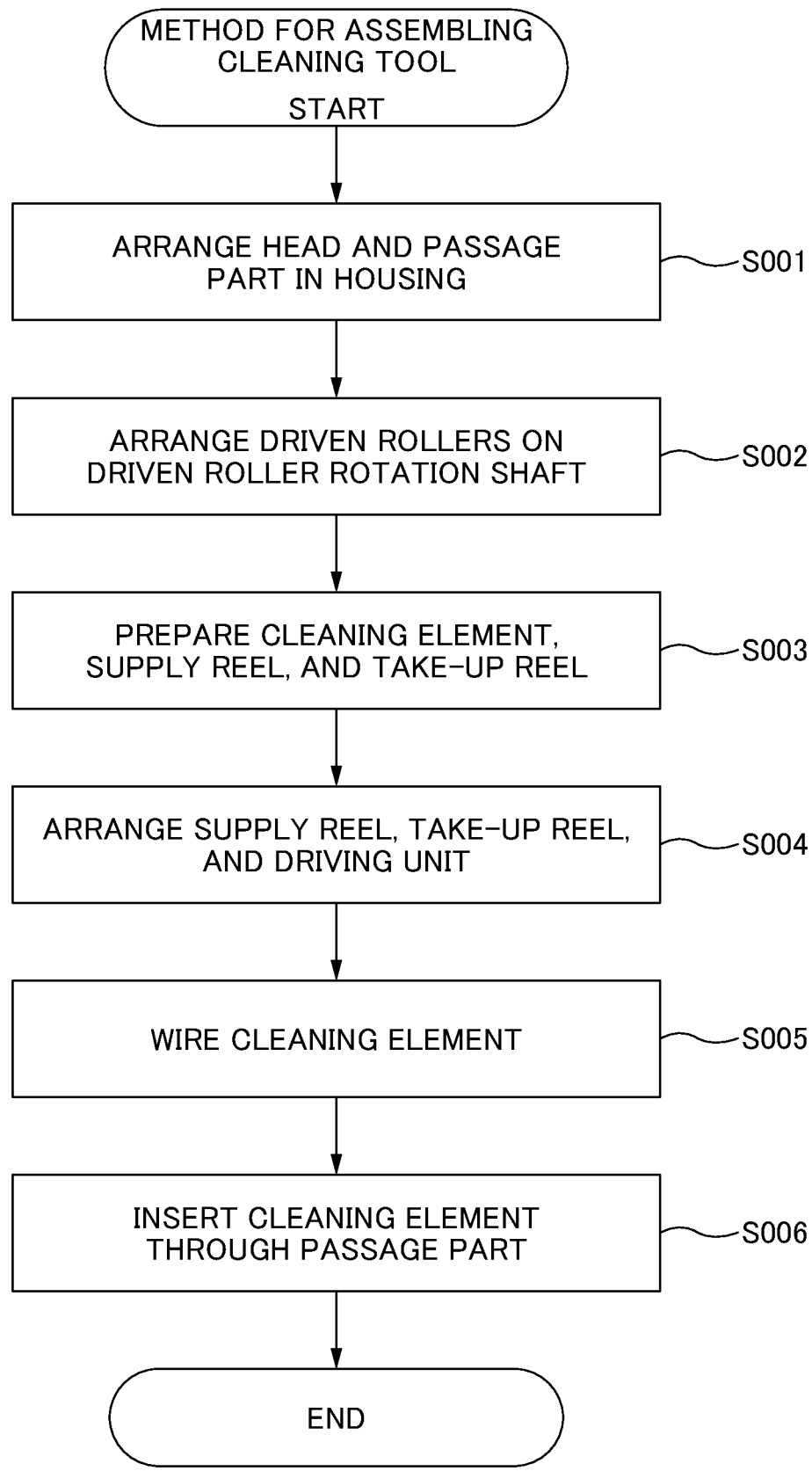
FIG. 13 is a flowchart of a method for assembling (method for manufacturing) the cleaning tool 10 according to one or more embodiments.

FIG. 13 is a flowchart of a method for assembling (method for manufacturing) the cleaning tool 10 according to one or more embodiments.

First, an operator arranges the head 12 and the pass-through component 40 in the housing 11 (S001). Next, the operator arranges the driven rollers 20 on the driven roller rotation shaft 17 (S002). In the cleaning tool 10 according to one or more embodiments, the plurality of sets of the driven rollers 20 (the supply-side driven roller 21 and the retrieve-side driven roller 22) are provided, and each set of the driven rollers 20 is arranged on the driven roller rotation shaft 17 one set at a time. Note that, when the driven rollers 20 are arranged on the driven roller rotation shaft 17, the supply-side driven roller 21 is arranged on the lower side and the retrieve-side driven roller 22 is arranged on the upward side. Then, the lower end part of the retrieve-side cylindrical part 25 of the retrieve-side driven roller 22 is inserted into the recessed part 27 of the supply-side driven roller 21. After the driven rollers 20 are arranged on the driven roller rotation shaft 17, the driven roller 20 is temporarily fixed to the driven roller rotation shaft 17 so as to prevent the driven rollers 20 from unintentionally coming off the driven roller rotation shaft 17 in a subsequent operation. At this time, instead of temporarily fixing the plurality of sets of the driven rollers 20 all at once, each set of the driven rollers 20 is temporarily fixed to the driven roller rotation shaft 17 one set at a time. In this way, a wiring operation of the cleaning element 1 can be easily performed without a temporarily fixed member being an obstacle.

Next, the operator prepares the cleaning element 1, the supply reel 13, and the take-up reel 14 (S003). Then, one of end parts of the cleaning element 1 is attached to the supply reel 13, and the other end part of the cleaning element 1 is attached to the take-up reel 14. Next, the operator arranges the supply reel 13, the take-up reel 14, and the driving unit 60 in the housing 11 (S004). Then, the operator wires the cleaning element 1 attached to the supply reel 13 and the take-up reel 14 (S005). The cleaning tool 10 according to one or more embodiments includes convey paths of the plurality of cleaning elements 1, but a wiring marking 29 (refer to FIG. 4A) is provided on a bottom surface of the housing 11, and thus it is possible to suppress the cleaning element 1 being wired on a false convey path. Note that, after the whole wiring operation of the plurality of cleaning elements 1 is completed, the partition member 31 of the partition 30 is installed.

Lastly, the operator inserts the cleaning element 1 through the pass-through component 40 (S006). For example, in the step (S001) of arranging the head 12 and the pass-through component 40 in the housing 11 described above, the pin 41A and the pin 41B of the pass-through component 40 are installed on the pin support part 42, and the operator inserts the cleaning element 1 through the slit 43.

Others

In the cleaning tool 10 according to one or more embodiments, the recessed part 27 is provided in the side surface of the supply-side flange part 24, and the lower end part of the retrieve-side cylindrical part 25 of the retrieve-side driven roller 22 is inserted into the recessed part 27 of the supply-side driven roller 21. However, the driven roller 20 may not be formed in such a manner. The partition 30 may not be provided.

Note that, when the cleaning element 1 is supplied from the supply reel 13, the cleaning element 1 may become loosened due to excessive rotation of the supply reel 13. Thus, a rotation prevention mechanism may be provided for preventing excessive rotation of the supply reel 13.

The foregoing embodiments are for facilitating the understanding of the present invention, and are not to be construed as limiting the present invention. The present invention may be modified and/or improved without departing from the gist thereof, and it goes without saying that the present invention encompasses any equivalents thereof.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cleaning element;
2: Tape surface;
3: Supply path;
4: Retrieve path;
5: Substrate;
6: Backplane housing;
7: Backplane-side optical connector
10: Cleaning tool;
11: Housing;
12: Head;

13: Supply reel;
14: Take-up reel;
16: Reel rotation shaft;
17: Driven roller rotation shaft;
18: Lid;
19: Head housing;
20: Driven Roller;
21: Supply-side driven roller;
22: Retrieve-side driven roller;
23: Supply-side cylindrical part;
24: Supply-side flange part;
25: Retrieve-side cylindrical part;
26: Retrieve-side flange part;
27: Recessed part;
28: Opening;
29: Wiring marking;
30: Partition;
31: Partition member;
32: Partition member supporter;
40: Pass-through component;
41A, 41B: Pin;
42: Pin support part;
43: Slit;
44: Elastic member;
60: Driving unit;
61: Driving lever;
62: Driving rotation shaft;
63: Conversion mechanism;
64: Transmission mechanism;
65: Reverse rotation prevention mechanism;
66: Rack;
67: Pinion;
68: Transmission wheel;
69: Transmission claw;
70: Engagement wheel;
71: Ratchet;
72: Check claw;
73: Coupling gear.

The invention claimed is:

1. A cleaning tool comprising:
a head that presses a cleaning element, having a tape shape, onto an optical connector;
a take-up reel that reels the cleaning element retrieved from the head;
one or more driven rollers that guide the cleaning element on a convey path from the head to the take-up reel;
a pass-through component with a slit through which the cleaning element is extended, the pass-through component being disposed between the one or more driven rollers and the take-up reel; and
a supply reel that supplies the cleaning element to the head, wherein
the one or more driven rollers include a supply-side driven roller and a retrieve-side driven roller that are rotatably disposed on a common rotation shaft,
the supply-side driven roller guides the cleaning element on a supply-side convey path from the supply reel to the head,
the retrieve-side driven roller guides the cleaning element on a retrieve-side convey path from the head to the take-up reel,
one of the supply-side driven roller and the retrieve-side driven roller comprises a first cylindrical part that contacts a tape surface of the cleaning element and a flange part protruding from the first cylindrical part, and the other of the supply-side driven roller and the retrieve-side driven roller comprises a second cylindrical part that contacts the tape surface of the cleaning element, and
a recessed part is formed in a side surface of the flange part of the one driven roller, and an end part of the second cylindrical part of the another driven roller is inserted into the recessed part.

2. The cleaning tool according to claim 1, wherein
a plurality of the driven rollers guide the cleaning element on the convey path, and
the pass-through component is located between the take-up reel and the driven roller disposed closest to the take-up reel on the convey path.

3. The cleaning tool according to claim 1, wherein a width of the slit is equal to or greater than a thickness of the cleaning element to be inserted through the slit and is less than twice the thickness of the cleaning element to be inserted through the slit.

4. The cleaning tool according to claim 1, wherein
the pass-through component comprises a first pin and a second pin, and
the slit is between the first pin and the second pin.

5. The cleaning tool according to claim 4, wherein,
the cleaning element is conveyed while being in contact with the first pin during a first reeling period that includes a point in time when reeling of the cleaning element starts, and
the cleaning element is conveyed while being in contact with the second pin during a second reeling period that starts from a predetermined point in time and ends at a point in time when reeling of an entire length of the cleaning element finishes.

6. The cleaning tool according to claim 1, wherein
the one or more driven rollers each comprise:
a cylindrical part that contacts a tape surface of the cleaning element, and
a flange part protruding from the cylindrical part.

7. A method for manufacturing a cleaning tool for cleaning an optical connector,
the cleaning tool comprising:
a head that presses a cleaning element having a tape shape onto the optical connector,
a take-up reel that reels the cleaning element retrieved from the head,
one or more driven rollers that guide the cleaning element on a convey path from the head to the take-up reel, and
a pass-through component with a slit through which the cleaning element is extended, the pass-through component being disposed between the one or more driven rollers and the take-up reel, and
a supply reel that supplies the cleaning element to the head,
the method comprising:
rotatably disposing the one or more driven rollers on a rotation shaft of the cleaning tool;
rotatably disposing a supply-side driven roller and a retrieve-side driven roller of the one or more driven rollers on a common rotation shaft;
inserting the cleaning element through the pass-through component;
guiding, with the supply-side driven roller, the cleaning element on a supply-side convey path from the supply reel to the head; and
guiding, with the retrieve-side driven roller, the cleaning element on a retrieve-side convey path from the head to the take-up reel, wherein one of the supply-side driven roller and the retrieve-side driven roller comprises a first cylindrical part that contacts a tape surface of the cleaning element and a flange part protruding from the first cylindrical part, and the other of the supply-side driven roller and the retrieve-side driven roller comprises a second cylindrical part that contacts the tape surface of the cleaning element, and a recessed part is formed in a side surface of the flange part of the one driven roller, and an end part of the second cylindrical part of the another driven roller is inserted into the recessed part.

\* \* \* \* \*